US012574692B2

(12) United States Patent
Michaelsen et al.

(10) Patent No.: US 12,574,692 B2
(45) Date of Patent: Mar. 10, 2026

(54) WIRELESSLY RECHARGEABLE HEARING DEVICE AND CHARGER FOR SAME

(71) Applicant: GN Hearing A/S, Ballerup (DK)

(72) Inventors: Anders Hjermø Michaelsen, Bagsværd (DK); Kim Falling Andersen, Borup (DK); Søren Davids, Jyllinge (DK); Palle Staffeldt, Kastrup (DK); Morten Lerstrup Pedersen, København S (DK); Anders Bøje Nielsen, Skovlunde (DK); Mikkel Nielsen, Solrød Strand (DK)

(73) Assignee: GN HEARING A/S, Ballerup (DK)

( * ) Notice: Subject to any disclaimer, the term of this patent is extended or adjusted under 35 U.S.C. 154(b) by 684 days.

(21) Appl. No.: 17/944,996

(22) Filed: Sep. 14, 2022

(65) Prior Publication Data

US 2023/0082030 A1     Mar. 16, 2023

(30) Foreign Application Priority Data

Sep. 15, 2021    (DK) ........................... PA 2021 70453

(51) Int. Cl.
*H04R 25/00*       (2006.01)
*H02J 50/00*       (2016.01)
*H02J 50/10*       (2016.01)
*H02J 50/12*       (2016.01)

(52) U.S. Cl.
CPC .......... *H04R 25/554* (2013.01); *H02J 50/005* (2020.01); *H02J 50/10* (2016.02); *H02J 50/12* (2016.02); *H04R 2225/31* (2013.01)

(58) Field of Classification Search
CPC .......................... H04R 25/554; H04R 2225/31; H04R 1/1025; H02J 50/005; H02J 50/10; H02J 50/12

USPC ................................................... 320/108, 109
See application file for complete search history.

(56) References Cited

U.S. PATENT DOCUMENTS

| | | | |
|---|---|---|---|
| 6,498,455 B2 | 12/2002 | Zink et al. | |
| 6,658,124 B1 * | 12/2003 | Meadows | H04R 25/55 |
| | | | 381/328 |
| 6,922,591 B2 | 7/2005 | Single | |
| 7,620,195 B2 * | 11/2009 | Bengtsson | H04R 25/305 |
| | | | 381/322 |
| 8,644,542 B2 * | 2/2014 | Klemenz | H02J 7/0042 |
| | | | 381/328 |
| 8,829,731 B2 * | 9/2014 | Baarman | H04B 5/00 |
| | | | 307/104 |

(Continued)

FOREIGN PATENT DOCUMENTS

| | | | |
|---|---|---|---|
| CN | 113015053 | 6/2021 | |
| DE | 29718104 U1 * | 1/1998 | H02J 7/025 |

(Continued)

OTHER PUBLICATIONS

European Search Report for EP Patent Appln. No. 22179394.6 dated Nov. 28, 2022.

(Continued)

*Primary Examiner* — Jared Fureman
(74) *Attorney, Agent, or Firm* — Vista IP Law Group, LLP

(57) ABSTRACT

The present disclosure relates to a wirelessly rechargeable hearing device, a charger for a wirelessly rechargeable hearing device, and a system comprising a wirelessly rechargeable hearing device and a charger for the wirelessly rechargeable hearing device.

32 Claims, 17 Drawing Sheets

(56) References Cited

U.S. PATENT DOCUMENTS

| | | | | |
|---|---|---|---|---|
| 10,841,684 | B2 | 11/2020 | Gu et al. | |
| 10,866,290 | B2 * | 12/2020 | Ding | H02J 50/10 |
| 11,122,376 | B2 | 9/2021 | Shriner et al. | |
| 11,387,679 | B2 * | 7/2022 | Teply | H02J 50/005 |
| 11,399,244 | B2 * | 7/2022 | Schmidt | H04R 1/1091 |
| 11,595,767 | B1 * | 2/2023 | Rufenacht | H04R 25/602 |
| 11,601,747 | B2 * | 3/2023 | Macomber | H04R 1/1091 |
| 11,670,962 | B2 * | 6/2023 | Jackson | G04G 19/02 |
| | | | | 320/108 |
| 11,700,472 | B1 * | 7/2023 | Sjoeroos | H02J 50/402 |
| | | | | 320/108 |
| 11,785,372 | B2 * | 10/2023 | Panecki | H02J 7/0044 |
| | | | | 381/380 |
| 11,962,985 | B2 * | 4/2024 | Pires | H04R 1/1025 |
| 12,046,914 | B2 * | 7/2024 | Chappell | H04R 25/602 |
| 12,052,548 | B2 * | 7/2024 | Shriner | H04R 25/55 |
| 12,245,001 | B2 * | 3/2025 | Aase | H04R 25/658 |
| 2014/0254844 | A1 * | 9/2014 | Shennib | H04R 25/00 |
| | | | | 320/108 |
| 2015/0245127 | A1 | 8/2015 | Shaffer | |
| 2016/0134959 | A1 * | 5/2016 | Shaffer | H04R 1/1025 |
| | | | | 381/74 |
| 2016/0308386 | A1 | 10/2016 | Tang et al. | |
| 2019/0089187 | A1 * | 3/2019 | Konomi | H01F 38/14 |
| 2020/0021127 | A1 | 1/2020 | Itagaki et al. | |
| 2020/0185968 | A1 | 6/2020 | Kim et al. | |
| 2020/0227954 | A1 * | 7/2020 | Ding | H02J 50/10 |
| 2020/0260176 | A1 * | 8/2020 | Baltensperger | H04R 25/55 |
| 2021/0185452 | A1 | 6/2021 | Nielsen et al. | |
| 2021/0265861 | A1 * | 8/2021 | Moussaoui | H02J 50/12 |
| 2021/0337319 | A1 * | 10/2021 | Narampanawe | H02J 50/10 |
| 2022/0200348 | A1 * | 6/2022 | Forrest | H02J 50/12 |
| 2022/0209585 | A1 * | 6/2022 | Chen | H01F 27/366 |
| 2023/0007412 | A1 * | 1/2023 | Aase | H04R 25/654 |
| 2023/0208193 | A1 * | 6/2023 | Forrester | A45C 11/00 |
| | | | | 320/108 |
| 2023/0411999 | A1 * | 12/2023 | Davids | H04R 1/1025 |

FOREIGN PATENT DOCUMENTS

| | | |
|---|---|---|
| DE | 102015203536 | 9/2016 |
| EP | 3151584 A2 | 4/2017 |
| EP | 3154275 A1 | 4/2017 |
| EP | 3573079 A1 | 11/2019 |
| EP | 3858431 A1 | 8/2021 |
| WO | WO 2015/048732 A1 | 4/2015 |
| WO | WO 2015/195735 A2 | 12/2015 |

OTHER PUBLICATIONS

Written Opinion for EP Patent Appln. No. 22179394.6 dated Nov. 28, 2022.

Extended European Search Report for EP Patent Appln. No. 21196878.9 dated Jun. 13, 2022.

Extended European Search Report for EP Patent Appln. No. 23199135.7 dated Apr. 23, 2024.

Foreign Exam Report for EP Patent Appln. No. 22179394.6 dated Feb. 21, 2025.

$1^{st}$ Technical Examination for Danish Patent Appln. No. PA 2021 70453 dated Mar. 1, 2022.

Partial European Search Report for EP Patent Appln. No. 21196878.9 dated Mar. 11, 2022.

Non-Final Office Action for U.S. Appl. No. 17/871,874 dated Oct. 24, 2025.

* cited by examiner

WIRELESSLY RECHARGEABLE HEARING DEVICE AND CHARGER FOR SAME

RELATED APPLICATION DATA

This application claims priority to, and the benefit of, Danish Patent Application No. PA 2021 70453 filed on Sep. 15, 2021. The entire disclosure of the above application is expressly incorporated by reference herein.

FIELD

The present disclosure relates to a wirelessly rechargeable hearing device having inductive charging circuitry, where the hearing device comprises a magnetic component configured to magnetically engage with another magnetic component comprised in a charger. Further, the disclosure relates to a charger for the wirelessly rechargeable hearing device, where the charger comprises a magnetic component, which is configured to magnetically engage with a magnetic component in the hearing device. Lastly, a system comprising the wirelessly rechargeable hearing device and the charger, and where the magnetic components and the induction coils are configured to aid the user in placing the hearing device in the charger in such a way that the induction coils are able to couple inductively.

BACKGROUND

A hearing device may be a hearable, an earphone, a hearing protection device, a hearing aid (e.g. an invisible-in-canal (IIC), completely-in-canal (CIC), in-the-canal (ITC), in-the-ear (ITE), receiver-in-ear (RIE), microphone-and-receiver-in-ear (MaRIE), behind-the-ear (BTE) hearing aid), an ear plug, or other hearing device. Such hearing devices contain a plurality of electronic components and circuits that create, process, and/or cancel audible sound for the potential benefit of the user. Some or all of the sound may be digitized and may be altered by one or more of the components and circuits, e.g. the sound may be amplified, filtered, moderated, equalized, adjusted, cancelled, etc.

The electronic components require power, which is supplied by a battery that may be rechargeable or non-rechargeable. If the battery is not rechargeable, the hearing device may have a battery door in the shell of the hearing device through which the battery can be removed and replaced. Having a battery door imposes design restrictions on the hearing device, which are especially significant for in-ear hearing devices, where there is little available space, making rechargeable batteries advantageous.

One option is wired recharging, wherein the battery is not replaced, but rather recharged by connecting the battery to an external charger via an electrical connection, e.g. via conductive contact points.

Another option is wireless recharging, where the battery is recharged using inductive charging. A fluctuating magnetic field created by an alternating current in a transmitter coil comprised in the charger induces an alternating electric current in a receiver coil comprised in the hearing device. The alternating current induced in the receiver coil is rectified and used to charge the battery. Thus, by using wireless charging the hearing device does not need a battery door nor an electrical wired pathway between the battery and a charger.

The strength of the coupling between the receiver coil and the transmitter coil is in part dependent on how well the two induction coils are aligned and the distance between them.

It is thus a technical problem with wirelessly rechargeable devices that the receiver and transmitter coils should be sufficiently aligned to achieve and to optimise the recharging of the hearing device.

The user is not aided in aligning the induction coils in the same way that the user is aided by the design of an electric wire and its corresponding plug(s), or by the design of the battery and the battery holder. Further, alignment between the induction coils becomes more difficult the smaller the hearing device is, and the smaller the induction coils are. Thus, the problem of achieving sufficient alignment of the induction coils is present in all wirelessly rechargeable hearing devices and can be particularly difficult for in-ear hearing devices, and especially the in-ear hearing devices with the smallest form factors such as the CIC hearing aids.

Therefore, it is an object to provide an improved wirelessly rechargeable hearing device.

It is a further object to provide a wirelessly rechargeable hearing device, which aids the user in placing the hearing device correctly in the charger such that recharging of the hearing device is possible and/or is optimised.

It is a further object to facilitate reproducible placement of the wirelessly rechargeable hearing devices in a charger.

It is further an object to provide an improved system for charging of a wirelessly rechargeable hearing device.

Further, it is desirable that the use of space available within the wirelessly rechargeable hearing device be optimised to limit design restrictions on hearing devices, which already struggle with having little available space.

SUMMARY

In a first aspect is provided a wirelessly rechargeable hearing device, in a second aspect is provided a charger for a wirelessly rechargeable hearing device, and in a third aspect is provided a system comprising a wirelessly rechargeable hearing device and a charger for the rechargeable hearing device. In the three aspects, the terms and features relate to the terms and features having the same name in the other aspects and therefore the descriptions and explanations of terms and features given in one aspect apply to the other aspects.

In the first aspect, the wirelessly rechargeable hearing device comprises a rechargeable battery and inductive charging circuitry comprising a receiver coil. The receiver coil is configured for inductive coupling to a transmitter coil in a charger, also referred to as a Tx coil. The hearing device further comprises a first magnetic component configured to magnetically engage with a second magnetic component comprised in the charger in such a way as to facilitate inductive coupling between the receiver coil and the transmitter coil.

The hearing device will have one or more functionalities related to hearing, such as one or more functionalities, which act to shield the user's ear canal from certain sounds, or one or more functionalities to aid users with hearing loss. Thus, the hearing device may be a hearing aid. In some embodiments, the hearing device is an in-ear hearing device, such as a completely-in-the-canal hearing aid.

Inductive charging circuitry is circuitry configured for charging a rechargeable battery wirelessly using magnetic induction. The inductive charging circuitry comprised in the hearing device comprises a receiver coil, also referred to as an Rx coil. The receiver coil may be any suitable shape or type of induction coil. The receiver coil may be a planar coil, such as a circular planar coil and/or a planar spiral coil and/or a single-layer planar coil and/or multi-layer planar coil. The planar coil may have two opposite planar surfaces and a peripheral edge. In some embodiments, the inductive charging circuitry is further configured according to a standard of wireless power transfer, such as the Near Field Communications (NFC) standard or the Qi standard. Usually, this will mean that the transmitter coil in the associated charger will be configured according to the same standard.

In some embodiments, the inductive charging circuitry is configured to the 140 KHz Qi® standard and allow frequency adaptation (such as 105 to 205 kHz) for maximum resonant power transfer during charging.

In some embodiments, the inductive charging circuitry is configured to use the 13.56 MHz NFC standard.

In some embodiments, the inductive charging circuitry is configured to use 6.78 MHz.

In some embodiments, the inductive charging circuitry is configured to use 333 kHz, or 131 kHz, as main frequency.

A coil axial centreline, also referred to as the axial line, of the receiver coil extends through the centre of the receiver coil and along its magnetic axis. For inductive charging, a receiver coil and a transmitter coil must couple, such that a fluctuating, i.e. time-varying, magnetic field created by the transmitter coil will result in an alternating electric current in the receiver coil. The strength of this coupling is in part dependent on how well the coil axial centrelines of the receiver and transmitter coils are coaxially aligned and the distance between the two induction coils, such as the distance between the centres of mass of the two induction coils.

The first magnetic component, which is configured to magnetically engage with a second magnetic component comprised in the charger, aids the user in reproducible and efficient placement of the hearing device at or in the charger. An advantage of using magnetic coupling for correct, reproducible placement of a hearing device at or in its charger is that the design restrictions on the charger are diminished, which reduces the complexity and cost of the charger. The reproducible placement does not mean that the placement has to be exactly the same every time, but that it is close enough to the optimal placement for inductive charging.

The charger does not need to have a shape that follows an outline of the hearing device in order for the hearing device to be placed correctly at or in the charger. Further, the charger does not need to have a lid to secure the hearing device nor does it require a lid in which the transmitter coil is comprised as a way to align the induction coils as is the case for many chargers in use today.

In some embodiments, the first magnetic component is a magnetic material, or a magnet. The magnetic material may be a metal, such as stainless steel. The magnet may be a permanent magnet, such as a permanent magnet that is ferromagnetic or ferrimagnetic, or such as a material having a weaker type of magnetism, or a temporary magnet, such as an electromagnet. The first magnetic component may be a first attachment interface.

In some embodiments, the first magnetic component is flat, i.e. has a dimension that is much smaller than the two other dimensions.

The first magnetic component is positioned within the hearing device in such a way that it can magnetically engage with a second magnetic component comprised in the charger in such a way as to facilitate inductive coupling between the receiver coil in the hearing device and the transmitter coil in the charger. By engage is meant that a magnetic component interacts magnetically with another magnetic component, i.e. there is a magnetic force between the two such that they either attract or repel each other. In some embodiments, the first magnetic component is configured such that it will attract and/or be attracted to the second magnetic component. The first and second magnetic components may be configured such that they will attract each other in some orientations of the hearing device in the charger and repel each other in other orientations of the hearing device in the charger.

The magnetic engagement between the first magnetic component and the second magnetic component acts to facilitate correct positioning of the induction coils, so that the induction coils can couple inductively.

In some cases, the hearing device may have a housing, and the first magnetic component may be inside the housing of the hearing device. The housing may have one or more housing parts that define a space (e.g., cavity) for accommodating one or more components of the hearing device. The housing parts may be made from polymer, metal, alloy, or a combination of the foregoing. Placing the first magnetic component inside the housing of the hearing device is advantageous because the housing may protect the first magnetic component from being damaged. In other embodiments, at least a part of the first magnetic component may be exposed to an external environment outside the hearing device. For example, the first magnetic component may have a surface that is flushed with an external surface of the housing of the hearing device.

In some cases, the first magnetic component may include a metallic element (e.g., plate) that is magnetically coupled and/or physically coupled (e.g., physically connected, abutting, etc.) to a magnet of the hearing device. The metallic element may be exposed to an outside environment of the hearing device. In such cases, the metallic element may provide some protection for the magnetic of the first magnetic component. The metallic element may be considered to be a part of the housing of the hearing device and/or a part of the first magnetic component.

Similarly, in some cases, the charger may have a housing, and the second magnetic component may be inside the housing of the charger. The housing may have one or more housing parts that define a space (e.g., cavity) for accommodating one or more components of the charger. The housing parts may be made from polymer, metal, alloy, or a combination of the foregoing. Placing the second magnetic component inside the housing of the charger is advantageous because the housing may protect the second magnetic component from being damaged. In other embodiments, at least a part of the second magnetic component may be exposed to an external environment outside the charger. For example, the second magnetic component may have a surface that is flushed with an external surface of the housing of the charger. In some cases, the second magnetic component may include a metallic element (e.g., plate) that is magnetically coupled and/or physically coupled (e.g., physically connected, abutting, etc.) to a magnet of the charger. The metallic element may be exposed to an outside environment of the charger. In such cases, the metallic element may provide some protection for the magnetic of the second magnetic component. The metallic element may be considered to be a part of the housing of the charger and/or a part of the second magnetic component.

In some embodiments, the second magnetic component of the charger may have a surface facing towards a rechargeable battery of the hearing device when the charger receives the hearing device for recharging. For example, the surface of the second magnetic component may be a rectilinear surface with a normal that intersects the battery of the hearing device when the charger receives the hearing device for recharging. The first magnetic component of the hearing device may also have a surface facing towards the recharge-able battery of the hearing device. For example, the surface of the first magnetic component may be a rectilinear surface with a normal that intersects the battery of the hearing device.

Another benefit of providing a metal plate in front of one or both of the magnets of the respective hearing device and charger is to reduce magnetic loss between the two magnets. Such magnetic loss may be caused by the plastic housings of respectively the hearing device and the charger (e.g., due to the thickness and material properties of the plastic between the two magnets). By replacing a part of the plastic housing with a metal plate in either or both of the hearing device and/or the charger, the attachment/magnetic force between the hearing device in the charger is improved.

In some embodiments, the wirelessly rechargeable hear-ing device comprises another magnetic component, a third magnetic component, which is configured to magnetically engage with either the second magnetic component com-prised in the charger and/or with a further magnetic com-ponent comprised in the charger, a fourth magnetic compo-nent. In some embodiments, a magnetic component in the hearing device will attract and/or be attracted to a magnetic component in the charger, and/or a magnetic component in the hearing device will repel/be repelled by a magnetic component in the charger. For the magnetic components to repel each other they will both need to be magnets of some kind. In some embodiments, the first and second magnetic components attract each other, the third and fourth magnetic components attract each other, the first and fourth magnetic components repel each other, and the second and third magnetic components repel each other. The resulting effect of the interaction between the magnetic component(s) in the hearing device and the magnetic component(s) in the char-ger is facilitating correct positioning of the induction coils for inductive charging and the magnetic components are configured to this end.

In some embodiments of the wirelessly rechargeable hearing device, particularly in the smaller types of hearing devices, where space is limited, the first magnetic compo-nent may be placed adjacent to the rechargeable battery. In some embodiments, the first magnetic component is shaped so as to at least partially follow an outer surface of the rechargeable battery. For example, if the rechargeable bat-tery is a round button cell battery, the first magnetic com-ponent may be flat and be positioned adjacent to a terminal of the battery, or the first magnetic component may be curved so as to be able to follow the curvature of the side of the battery and be positioned adjacent to that side of the battery. In some embodiments, all the dimensions of the first magnetic component are all equal to or smaller than all the dimensions of the rechargeable battery. In some embodi-ments, one or more dimensions of the first magnetic com-ponent has a defined diameter, e.g. the first magnetic com-ponent is circular, or elliptical.

In some embodiments, the first magnetic component is an integral part of the rechargeable battery. For example, the battery exterior may comprise a magnetic material, such as a magnetic metal, and the rechargeable battery may be configured to be able to magnetically engage with a magnet positioned in the charger.

The first magnetic component is configured to magneti-cally engage with a second magnetic component comprised in the charger in such a way that, when the first and second magnetic components engage appropriately, the receiver coil can inductively couple to the transmitter coil. The hearing device may further comprise one or more indicators such as one or more visual indicators, such as one or more icons and/or one or more coloured surfaces to further aid the user in correct placement of the wirelessly rechargeable hearing device in the associated charger. Likewise, the associated charger may comprise one or more indicators such as one or more visual indicators, such as icons and/or one or more coloured surfaces to further aid the user in correct placement of the wirelessly rechargeable hearing device in the associ-ated charger. Alternatively, or additionally, the one or more indicators may be textual, or shapes that fit together.

The wirelessly rechargeable hearing device may further comprise yet another magnetic component, a third magnetic component. Likewise, the associated charger may further comprise another magnetic component, a fourth magnetic component. The third magnetic component is configured to magnetically engage with the second magnetic component comprised in the charger, and/or with the fourth magnetic component comprised in the charger.

In some embodiments, the receiver coil is positioned adjacent to the rechargeable battery. The receiver coil may be adhered directly onto the rechargeable battery and the distance is then mostly determined by the thickness of the adhesive, where the adhesive could be e.g. glue or tape. A receiver coil magnetic shielding, such as a ferrite disc or plate, or a frame structure materiel may be placed in-between the receiver coil and the rechargeable battery. In some embodiments, the receiver coil may be adjacent to the rechargeable battery by being at a distance from a side (e.g., outer surface) of the rechargeable battery, wherein the distance is anywhere between 0.1 mm and 1 mm, such as 0.12 mm and 0.8 mm, such as 0.15 and 0.6 mm.

In some embodiments, the receiver coil is positioned adjacent to a side of the rechargeable battery, or the receiver coil is positioned adjacent to a terminal of the rechargeable battery, i.e. adjacent to the negative or positive terminal. For example, the receiver coil may be adjacent to the terminal of the rechargeable battery by being at a distance from the terminal, wherein the distance is anywhere between 0.1 mm and 1 mm, such as 0.12 mm and 0.8 mm, such as 0.15 and 0.6 mm.

In some embodiments, the receiver coil may have a planar configuration. For example, the receiver coil may have a plurality of loops forming a spiral arrangement, wherein the loops may all lie within a plane. As another example, the receiver coil may have a plurality of loops that are arranged in series, with a cross-sectional dimension of each loop being larger than a total combined thickness of all of the loops, thereby forming a planar configuration for the receiver coil. Also, in some embodiments, a plane (e.g., a plane in which a loop of the receiver coil lies) of the receiver coil may have a normal that intersects the rechargeable battery of the hearing device.

In some embodiments, the first magnetic component is configured to be able to engage magnetically with the second magnetic component in a direction that is at an angle of between 75 to 105 degrees, such as between 80 to 100 degrees, such as between 85 to 95 degrees, to the coil axial centreline of the receiver coil. That is, there is roughly a 90 degree angle between the magnetic coupling direction and the inductive coupling direction.

The inductive coupling direction is the primary direction, the optimal direction, of inductive coupling for the induction coil and will follow the axial centreline of the induction coil. Ideally, the receiver and transmitter coils are coaxially aligned such that the axial centrelines of the receiver coil and transmitter coil are parallel and aligned. However, a perfect coaxial alignment of the two induction coils is not necessary for inductive coupling and some deviation from the ideal is permissible, although too much deviation will result in poor or no charging.

The magnetic coupling direction is the primary direction of the magnetic force between the magnetic components, i.e. direction in which the resultant magnetic force is strongest.

In some embodiments, the first magnetic component is configured to be able to engage magnetically with the second magnetic component in a direction that is at an angle of between −15 to 15 degrees, such as between −10 to 10 degrees, such as between −5 to 5 degrees, to the axial centreline of the receiver coil. That is, the magnetic coupling direction and the inductive coupling direction are roughly at zero degree angle to each other.

In some embodiments, the first magnetic component is positioned in-between the receiver coil and the rechargeable battery.

In the second aspect, the charger for a wirelessly rechargeable hearing device comprises a transmitter coil, which is configured for inductive coupling to a receiver coil in the hearing device. The charger further comprises a second magnetic component configured to magnetically engage with a first magnetic component comprised in the hearing device in such a way as to facilitate inductive coupling between the receiver coil and the transmitter coil. The transmitter coil may be a planar coil, such as a circular planar coil and/or a planar spiral coil and/or a single-layer planar coil and/or multi-layer planar coil. The planar coil may have two opposite planar surfaces and a peripheral edge.

In some embodiments, the second magnetic component is a magnetic material, or a magnet. The magnetic material may be a metal, such as stainless steel. The magnet may be a permanent magnet, such as a permanent magnet that is ferromagnetic or ferrimagnetic, or such as a material having a weaker type of magnetism, or it may be a temporary magnet, such as an electromagnet. The second magnetic component may be a second attachment interface.

In some embodiments, the distance between the transmitter coil and an outer surface of the charger is between 0.1 mm and 1 mm, such as 0.12 mm and 0.8 mm, such as 0.15 and 0.6 mm.

In some embodiments, the transmitter coil may have a planar configuration. For example, the transmitter coil may have a plurality of loops forming a spiral arrangement, wherein the loops may all lie within a plane. As another example, the transmitter coil may have a plurality of loops that are arranged in series, with a cross-sectional dimension of each loop being larger than a total combined thickness of all of the loops, thereby forming a planar configuration for the transmitter coil. Also, in some embodiments, a plane (e.g., a plane in which a loop of the transmitter coil lies) of the transmitter coil may have a normal that intersects the rechargeable battery of the hearing device when the charger receives the hearing device for recharging the battery of the hearing device.

In the third aspect, the system comprises a wirelessly rechargeable hearing device according to the first aspect and a charger according to the second aspect. The first and second magnetic components and the induction coils are configured to facilitate placement of the hearing device at or in the charger in such a way that the induction coils are able to couple inductively.

In some embodiments, the first and second magnetic components are configured so as to define a predetermined position for the hearing device 1 at or in the charger 25 in which the receiver coil 3 aligns sufficiently with the transmitter coil 27 to enable wireless charging. The predetermined position may be a plurality of orientations, e.g. due to rotational symmetry, or due to allowable deviations from perfect alignment of the induction coils.

In some embodiments, the receiver coil diameter is smaller than the transmitter coil diameter.

The diameter of the receiver coil and of the transmitter coil is the diameter as commonly defined for the type of induction coil used as receiver and/or transmitter coil. It may be possible for a given induction coil to have defined both an inner and an outer diameter, but for the purposes of hearing devices, where size is an important factor, it is the outer diameter that is referred to here. In some embodiments, the diameter of the receiver coil is between 1 mm and 12 mm, for example between 3 mm and 10 mm, for example between 5 mm and 8 mm, or for example between 6 mm and 7 mm. The smaller the hearing device, the smaller the required maximum form factor of the receiver coil will be with the harshest requirement being for hearing devices of the CIC-type, i.e. where the entire functional part of the hearing device is placed within the ear canal with the intent that the hearing device is nearly invisible except for possibly a tiny pull-out wire showing outside of the ear canal.

The larger the two induction coils are, the less significance a deviation from a coaxial alignment has. The size of the receiver coil is to a large degree determined by the available space within the hearing device and may be limited by the constraints of the volume and space within the hearing device, particularly in the smaller types of hearing devices. The transmitter coil, which is positioned in a charger, however, do not usually have the same constraints and the transmitter coil may advantageously have a larger diameter than the receiver coil.

In some embodiments, the receiver coil and the transmitter coil are configured such that the distance between the centre of mass of the receiver coil and the centre of mass of the transmitter coil is less than or equal to 5.0 mm, such as less than or equal to 4.0 mm, such as less than or equal to 3.0 mm, such as less than or equal to 2.0 mm, when the wirelessly rechargeable hearing device is placed correctly in the charger for charging.

Ideally, the receiver and transmitter coils are coaxially aligned, when the hearing device is placed at or in the charger for charging, such that the axial centrelines of the receiver coil and transmitter coil are parallel and aligned. However, a perfect coaxial alignment of the two induction coils is difficult to achieve and not necessary for the charging.

In some embodiments, the receiver coil is placed in the hearing device such that a predefined coil distance between the receiver coil and the transmitter coil is provided independent of size and/or shape of the hearing device when the hearing device is placed in the charger.

The predefined coil distance may be obtained by always having the same position of the receiver coil in the faceplate of the hearing device. The battery and/or the first magnetic component and/or the receiver coil may be positioned and/or detachable attached/fixed in a predefined position in the faceplate of the hearing device. The predefined coil distance may further be obtained by having the same position of the faceplate of the hearing device in the charger independent of type, shape and size of the hearing device.

It is an advantage to have a predefined coil distance between the receiver coil in the hearing device and the transmitter coil in the charger being independent on shape and/or size of hearing devices to be placed in the charger, as there is a clear correlation between the charging performance of a pair of receiver and transmitter coils, the size of a pair of receiver and transmitter coils and the distance between a pair of receiver and transmitter coils. Having the predefined coil distance thereby allow for a controlled charging performance of the charging system.

In some embodiments, a gap between a hearing device gap sidewall and a charger gap sidewall allows for hearing devices of different sizes and/or shapes to fit into the same charger.

In some embodiments, the charger comprises a charger base and a removable insert, wherein the removable insert comprises a hearing device cavity adapted to the shape of the hearing device, and wherein the removable insert provides an additional or an alternative attachment interface to the first and second magnetic components between the hearing device and the charger.

In some embodiments, the charger comprises a snap connection configured for receiving a hearing device, wherein the snap connection provides an additional or an alternative attachment interface to the first and second magnetic components between the hearing device and the charger.

BRIEF DESCRIPTION OF THE DRAWINGS

In the following, exemplary embodiments are described in more detail with reference to the appended drawings, wherein.

DETAILED DESCRIPTION

Figure 1:
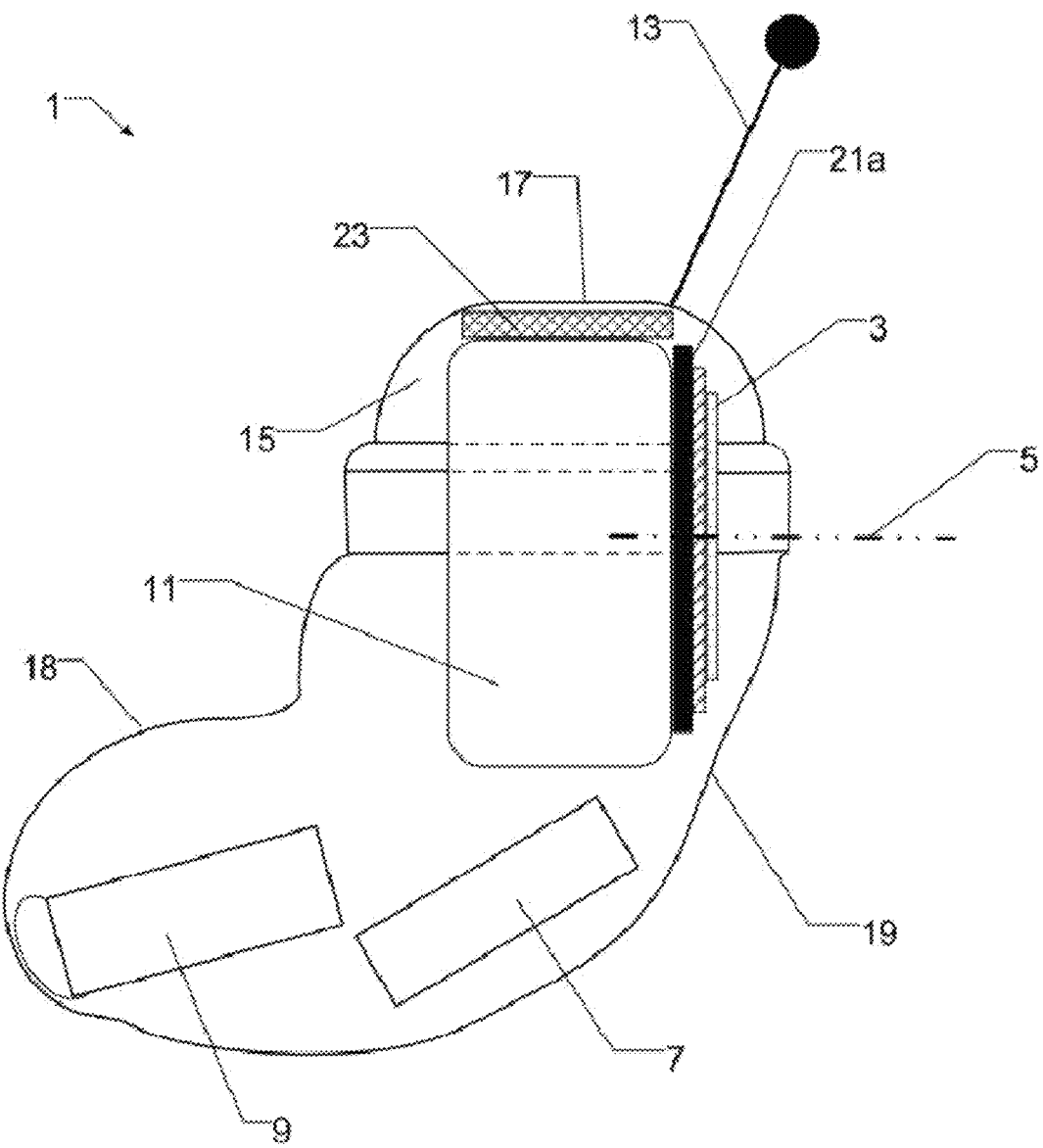
FIG. 1 schematically illustrates a wirelessly rechargeable hearing device in accordance with exemplary embodiments.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following various exemplary embodiments of the disclosed wirelessly rechargeable hearing device, charger for a wirelessly rechargeable hearing device, and system comprising a wirelessly rechargeable hearing device and a charger for a wirelessly rechargeable hearing device are described with reference to the appended drawings. The elements shown in the drawings are not necessarily drawn to scale, but are primarily drawn to illustrate relative position, orientation, and function.

FIG. 1 schematically illustrates a wirelessly rechargeable hearing device 1. The hearing device 1 is an in-ear hearing device, which is made to be positioned at least partly within the ear canal EC of a user, see FIG. 2. The hearing device may be a hearing aid and may be one of the in-ear hearing aids known as invisible-in-canal (IIC), completely-in-canal (CIC), in-the-canal (ITC), or in-the-ear (ITE). The drawing illustrates both the outline of the hearing device 1 as well as some of the internal components in a partially transparent side view.

To protect the components within the hearing device 1, the hearing device 1 has a shell intended to help keep out ear wax, dirt, water, oil etc. The in-ear hearing device shell is made up of a faceplate surface 17 and one or more hearing device sidewalls 19, where at least a part of the hearing device sidewalls 19 comprises an in-ear part 18.

Figure 2:
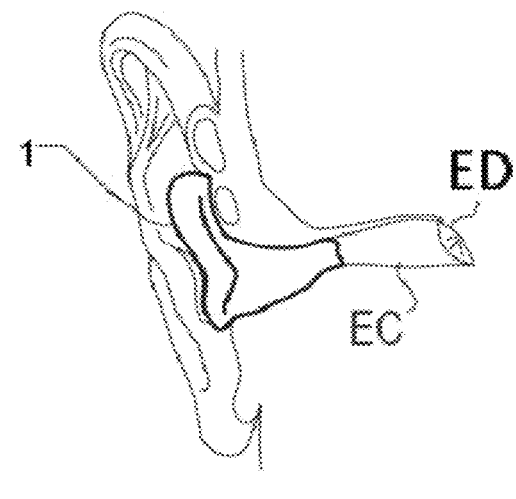
FIG. 2 illustrates an in-ear hearing device positioned within the ear canal of a user.

When the in-ear hearing device 1 is in place at least partly within the user's ear canal, at least part of the faceplate surface 17 faces towards the outside of the ear canal, i.e. in a direction generally opposite the eardrum ED, see FIG. 2. In some models of in-ear hearing devices 1, the faceplate surface 17 will have one or more microphone openings and possibly buttons, switches, etc. with which the user can interact with the in-ear hearing device 1, for example to change settings and/or turn the in-ear hearing device 1 on/off. In the embodiment in FIG. 1, the faceplate surface 17 is the outer surface of a faceplate 15. The faceplate 15 may be thin or thick when compared to the rest of the hearing device, and it may be formed as an integral part or as a separate part of the in-ear hearing device 1.

The shell is positioned at least partially inside the ear canal of the user, when the in-ear hearing device 1 is in use and at least a part of it is thus shaped to fit inside an ear canal, such as the in-ear part 18. The shape of the in-ear part 18 may be a generic shape that allows the hearing device to be placed within the ear of any user or at least a plurality of users, or the shape may, at least in part, be moulded to fit a particular user better in which case the hearing device is referred to as a custom hearing device. Thus, the shell may be individually shaped to fit inside the ear canal of a particular user. Such an individually shaped in-ear hearing device is known as a custom hearing device and may be made by a process, which entails obtaining a physical or computerized model of part of the particular user's ear canal.

The one or more hearing device sidewalls 19 of an in-ear hearing device 1 will usually not contain microphones, buttons, switches, etc. as the one or more hearing device sidewalls 19 will typically be adjacent to, or face toward, a part of the user's ear or ear canal, when the in-ear hearing device 1 is in place. Such components will therefore usually be positioned in the faceplate 15 of an in-ear hearing device 1. If the in-ear hearing device 1 is of a type that is positioned far within the user's ear canal in such a way that it is difficult or near impossible for the user to grab the shell itself for removal, the in-ear hearing device 1 may comprise a means for aiding in the removal of the in-ear hearing device 1, e.g. a pull-out wire 13.

The in-ear hearing device has hearing device components arranged within the hearing device shell, such as a receiver 9, i.e. a speaker, and electronics 7, where the electronics 7 may be electronic components and circuits that create, process, and/or cancel audible sound. The receiver 9 is typically arranged in the proximal end of the in-ear hearing device 1 such that it is close to the eardrum ED of the user when the hearing device 1 is inserted into the user's ear canal EC, see FIG. 2.

To supply power to electronic components within the hearing device 1, the hearing device 1 has a rechargeable battery 11, which is recharged by inductive charging. To this end, the in-ear hearing device 1 has inductive charging circuitry comprising a receiver coil 3 and circuitry for rectifying the alternating current induced in the receiver coil 3 during operation. The receiver coil 3 is comprised of a copper layer (horizontal line pattern) on a PCB (angled line pattern) with a receiver coil magnetic shielding 21a (black rectangle) made of e.g. ferrite. The receiver coil magnetic shielding 21a acts to concentrate the magnetic field created during induction to the inductive coil instead of wasting energy, e.g. by heating of the surrounding components such as the battery 11. Further, a magnetic shielding will often be positioned and configured such that the potential adverse effect of the magnetic flux on other components of the hearing device is diminished. A transmitter coil magnetic shielding 21b may similarly be placed in relation to a transmitter coil 27 in a charger 25 for the wirelessly rechargeable hearing device 1, see FIG. 5, 7, 8, 10-13. The magnetic shielding 21a, 21b may be further configured to diminish the effects of magnetic components within the hearing device 1 and or the charger 25 such as negative effects on the induction coils 3, 27 and/or the charging field.

A magnetic shielding 21a, 21b is not essential and may therefore be absent or may only be present adjacent to one of the induction coils, i.e. in connection with either the receiver coil 3 or transmitter coil 27. The magnetic shielding 21a, 21b is shown as a solid disc or plate, but may have any functional shape and may not be a solid plate, e.g. it may be a latticework. The skilled person will know that the magnetic shielding 21a, 21b may have a different geometry than that shown to achieve its intended functionality.

Figure 3:
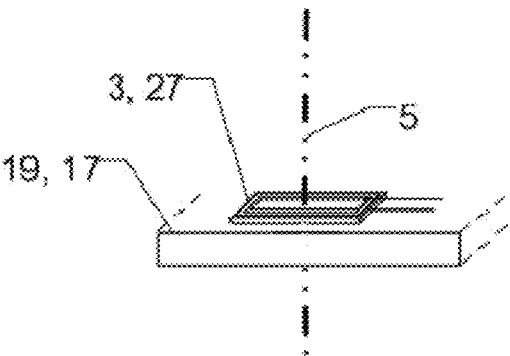
FIG. 3 illustrates an induction coil positioned adjacent to a hearing device sidewall, and/or a faceplate surface, or a charger sidewall, FIG. 4 schematically illustrates a wirelessly rechargeable hearing device in accordance with exemplary embodiments, FIG. 5 schematically illustrates a wirelessly rechargeable hearing device placed at or in a charger for a wirelessly rechargeable hearing device in accordance with exemplary embodiments, FIG. 6 schematically illustrates a wirelessly rechargeable hearing device in accordance with exemplary embodiments, and FIGS. 7-14 schematically illustrates a wirelessly rechargeable hearing device placed at or in a charger for a wirelessly rechargeable hearing device in accordance with exemplary embodiments.
Figure 4:
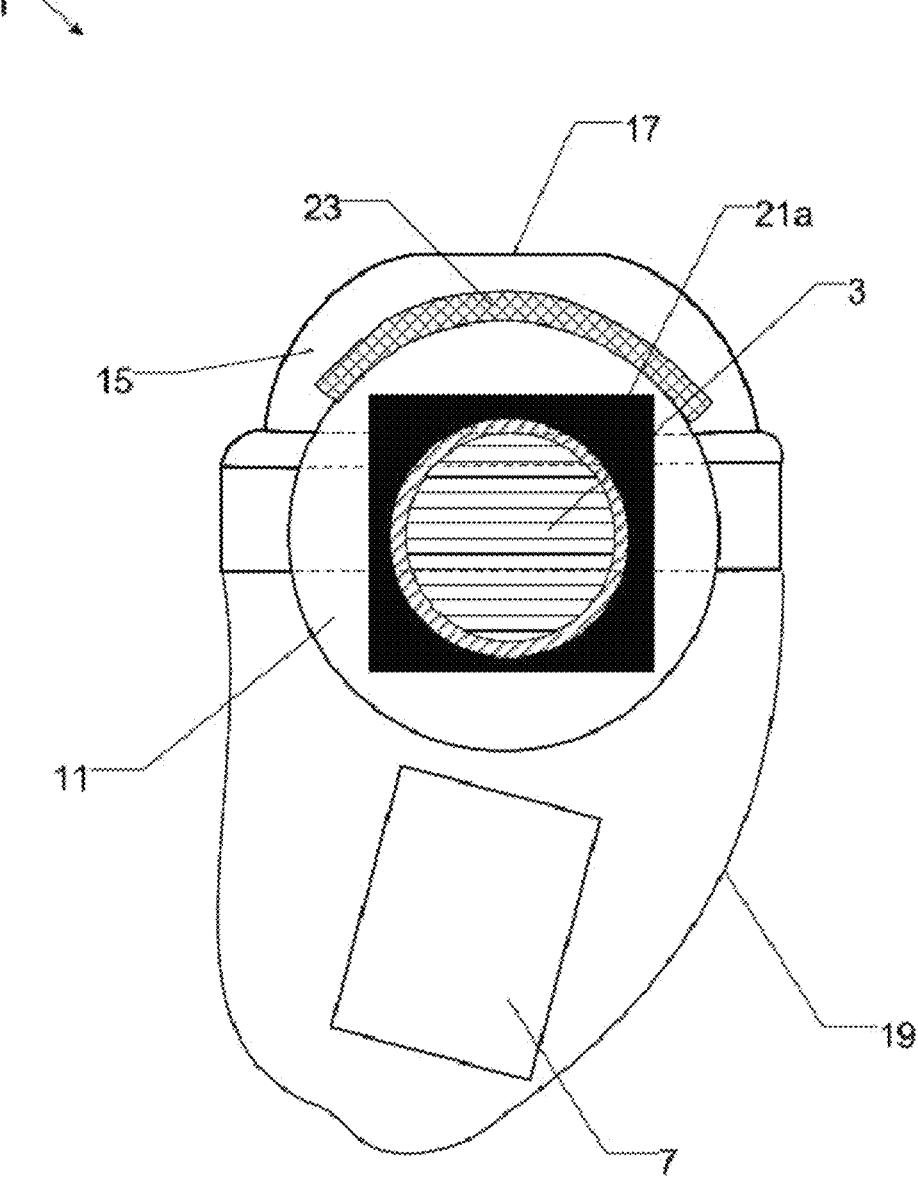

The induction coils, such as the receiver coil 3 and a transmitter coil 27, are said to have a coil axial centreline 5, which will often be both the magnetic and geometric centre of the induction coil(s), see FIG. 3 and FIG. 4, and the wireless charging is most efficient when the coil axial centrelines 5 of the transmitter and receiver coils are aligned. In practice, there will be some degree of misalignment between the two induction coils, and the greater the misalignment, the less efficient the charging.

Another important factor for efficient induction charging is distance between the transmitter and receiver coils. Therefore, the inductions coils are placed such that they can get as close to each other as possible and such that they can align as well as possible. FIG. 3 shows an induction coil 3, 27 positioned adjacent to a hearing device sidewall 19 and/or a faceplate surface 17 or a surface 20 of a charger for a wirelessly rechargeable hearing device with its coil axial centreline 5 pointing through the adjacent sidewall 19, 20 or faceplate surface 17. By being positioned closely adjacent to a sidewall 19, 20 or faceplate surface 17 the induction coil 3, 27 will be close to the outer surface of the hearing device 1 or charger 25 so that it may get close to the other induction coil 3, 27. Preferably, the induction coil will be positioned as close as possible to the adjacent sidewall 19, 20 or faceplate surface 17, which will often mean that its coil axial centreline 5 will be at an angle close to 90 degrees with respect to the sidewall or faceplate surface.

Instead of being positioned adjacent to a sidewall 19, 20 or the faceplate surface 17, an induction coil 3, 27 may be placed in an indent in the adjacent sidewall/surface 17, 19, 20 or in a through-hole in the adjacent sidewall/surface 17, 19, 20. If placed in a through-hole, the induction coil 3, 27, to protect it from the environment outside the hearing device 1 or charger 25, may have a protective coating and/or be covered by a lacquer.

To facilitate reproducible placement of the hearing device 1 in or at the charger 25 such that the induction coils 3, 27 are aligned sufficiently for induction charging, the hearing device 1 has a first magnetic component 23, which is configured to magnetically engage with a magnetic component in a charger. The first magnetic component 23 may be a first attachment interface and the second magnetic component may be a second attachment interface. The first magnetic component 23 as shown in FIG. 1 could be any suitable shape e.g. a bar, a rectangular plate, or a disc. In the embodiment shown in FIG. 1, the rechargeable battery 11 is a button cell battery and the first magnetic component 23 is positioned adjacent to a side of the rechargeable battery 11, while the receiver coil 3 is positioned adjacent to a terminal of the battery 11. The first magnetic component 23 could be a magnet, and the magnetic component in the charger could be a magnetic material or it could also be a magnet. If the first magnetic component 23 is not magnetic itself, the second magnetic component in the charger alone will have to provide the magnetization necessary for the two components to magnetically engage.

In its position in the faceplate 15 and close to the faceplate surface 17 the first magnetic component 23 is in a suitable position for it to be configured to be able to engage magnetically with the magnetic component in the charger in a direction that is perpendicular, or close to being perpendicular, to the coil axial centreline 5 of the receiver coil 3, i.e. perpendicular to, or close to perpendicular to, the direction of optimal induction coupling. An advantage of this configuration of the magnet engagement and the induction coupling is that it simplifies configuration of the magnetic components and induction coils to ensure that the effects of the magnetic flux from the magnetic components does not significantly diminish the efficiency of the induction charging.

Positioning the receiver coil 3 and first magnetic component 23 in or near the faceplate 15 may allow for the same internal architecture of the hearing device 1 to be used between models, types and/or custom hearing devices individualized for different users even though part of the shape of the rest of the shell in the different hearing devices is dissimilar.

The first magnetic component 23 may further be configured such that magnetic engagement with it can be used in extraction of the in-ear hearing device 1 from the ear canal ED of the user, i.e. as a means for aiding in the removal of the in-ear hearing device 1, e.g. instead of using a pull-out wire 13. As the first magnetic component 23 is positioned in the faceplate 15 and near to the faceplate surface 17, which faces towards the outside of the user's ear canal ED when in position at least partly within the ear canal ED, it could be configured to attract or be attracted to a magnetic component in an extraction device operated by the user and thereby the hearing device 1 could be pulled in the direction out of the user's ear.

Placing the receiver coil 3 adjacent to a terminal of the battery 11 as shown in FIG. 1, can be a way to optimise the use of available space within the in-ear hearing device 1. In-ear hearing devices, in particular the smallest types, typically have very limited space for the components that are required to provide the desired functionalities.

FIG. 2 shows a user's ear as well as parts of the inner ear, and illustrates an in-ear hearing device 1 positioned within the ear canal, EC. When the in-ear hearing device 1 is in place within the user's ear canal EC, its receiver 9 (see FIG. 1), which is typically arranged in the proximal end of the in-ear hearing device 1, is close to the eardrum ED.

FIG. 3 illustrates an induction coil 3, 27, such as a receiver coil 3 or a transmitter coil 27, positioned adjacent to a hearing device sidewall 19, a faceplate surface 17, or a sidewall of a charger 20. The induction coil 3, 27 has a coil axial centreline 5, which extends through the centre of the induction coil and along its magnetic axis.

FIG. 4 schematically illustrates a wirelessly rechargeable hearing device 1. The hearing device 1 could be similar to the hearing device 1 shown in FIG. 1 (seen from a direction that is normal to the terminals of the rechargeable battery 11) with the exception that the first magnetic component 23 is shaped to follow the outer surface of the rechargeable battery 11. Shaping the first magnetic component 23 thusly could be another way to optimise the available space within the hearing device 1.

The receiver coil magnetic shielding 21a is shaped as a plate that is at least partially solid and may be made of e.g. ferrite, while the receiver coil 3 is shown as being circular, but may have any suitable shape.

Figure 5:
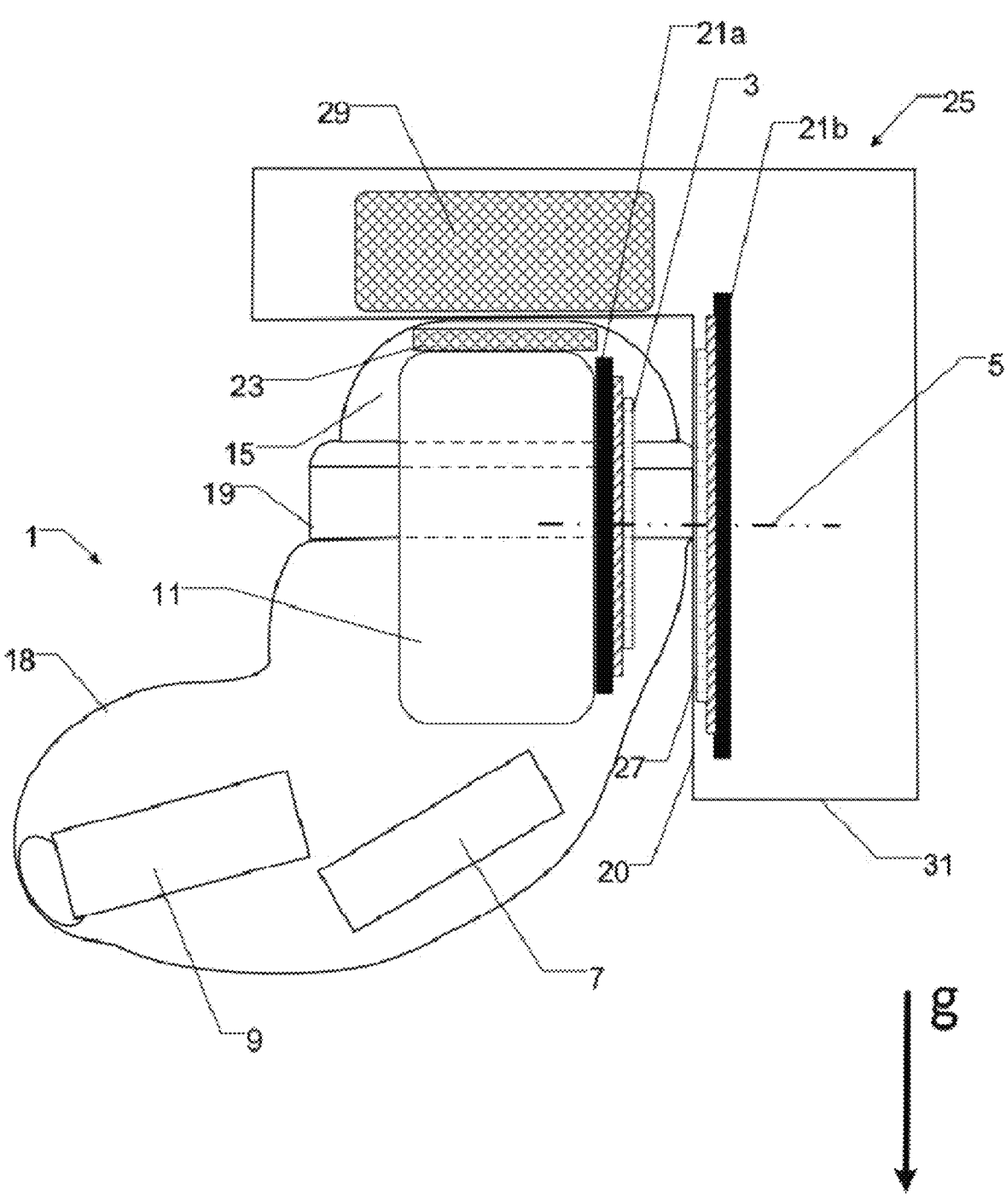

FIG. 5 schematically illustrates a wirelessly rechargeable hearing device 1 placed at or in a charger 25 for a wirelessly rechargeable hearing device. The hearing device 1 may be a hearing device 1 similar to the hearing device shown in FIG. 1 (possibly without the pull-out wire 13) or the hearing device shown in FIG. 4.

The charger 25 has inductive charging circuitry with a transmitter coil 27, which is configured to be able to inductive couple to the receiver coil 3 in the hearing device 1. The transmitter coil 27 is comprised of a copper layer (horizontal line pattern) on a PCB (angled line pattern) with a transmitter coil magnetic shielding 21b (black rectangle) made of e.g. ferrite. The transmitter coil 27 is positioned close to a surface 20 of the charger 25 such that it can get close enough to the receiver coil 3 for inductive charging.

The receiver coil 3 and/or transmitter coil 27 may be planar coils, such as circular planar coils and/or planar spiral coils and/or single-layer planar coils and/or multi-layer planar coils. The planar coils may each have two opposite planar surfaces and a peripheral edge. One of the planer surfaces may be a front surface comprising the copper layer. The other planer surface may be a back surface comprising respectively the receiver or transmitter coil magnetic shielding 21a, 21b or the PCB. The peripheral edge may comprise the peripheral edge of the copper layer, the PCB and/or respectively the receiver or transmitter coil magnetic shielding 21a, 21b.

The induction coils 3, 27, i.e. the receiver coil 3 and the transmitter coil 27, will be configured to operate at one or more frequency ranges and they may be configured according to a standard of wireless power transfer, such as e.g. the Near Field Communications (NFC) standard, or the Qi® standard. An advantage of using induction coils configured according to the NFC standard is that this configuration is better able to handle "noise", such as the noise from a static magnetic field created by one or more of the magnetic components 23, 29. Both the receiver coil 3 and the transmitter coil 27 are positioned close to an outer surface so they can get close enough to each other to allow for efficient wireless charging.

A second magnetic component 29 in the charger 25 is configured to magnetically engage with the first magnetic component 23 in the hearing device 1 such that the two components attract each other. The second magnetic component 29 may be a second attachment interface. In the embodiment shown in FIG. 5, the charger 25 has an L-shaped charger casing 31 with the transmitter coil 27 positioned in one leg and the second magnetic component 29 positioned in the other leg. The two legs may in this embodiment be perpendicular to each other or approximately perpendicular to each other. When the hearing device is placed in or close to the corner, i.e. the inner corner, of the two legs of the charger, the first and second magnetic components 23, 29 magnetically engage, which aids the user in correct, reproducible placement of the hearing device at or in the charger such that the induction coils are in position for wireless charging. The L-shaped charger 25 could be wall mounted or have a stand on which it rests.

The magnetic force between the first and second magnetic components 23, 29 may be strong enough to hold the hearing device 1 against gravity (arrow marked g), e.g. such that the hearing device 1 "hangs" in the charger 25. An advantage of this type of "open" construction charger, which is minimally shaped to the shape of a hearing device 1, is that it can more easily be designed to be used with a plurality of hearing devices of different types. For example, the same charger may be used for different types of in-ear hearing aids, e.g. an invisible-in-canal (IIC), completely-in-canal (CIC), in-the-canal (ITC), in-the-ear (ITE), or even used for both in-ear types and larger hearing aids such as receiver-in-ear (RIE), microphone-and-receiver-in-ear (MaRIE), and behind-the-ear (BTE) hearing aid. Another advantage of the open construction charger is the simplicity of the design.

If the magnetic engagement between the first and second magnetic components 23, 29 allows the hearing device 1 to be positioned in the charger 25 in multiple ways the hearing device 1 and charger 25 may have an indicator to further aid the user in reproducibly placing the hearing device 1 correctly in the charger 25. For example, in the embodiment shown in FIG. 5, the magnetic components attract each other and the magnetic force between them may have rotational symmetry with respect to the normal of the faceplate surface. In this case, to aid the user, the hearing device 1 and/or the charger 25 may have an indicator, e.g. visual, textual, etc., to indicate how the hearing device 1 should be rotated while the magnetic components are engaged magnetically for the induction coils to be aligned sufficiently. Alternatively, or additionally, the hearing device 1 and/or charger 25 may provide the user with a visual and/or audible signal to alert and/or inform the user, e.g. when the induction coils 3, 27 are in position for charging, commencing or halting charging, status of charging, etc. For example, one or more LEDs on the charger 25 and/or on the hearing device 1 may light up to indicate charging and possibly how much the hearing device 1 has been recharged.

Figure 6:
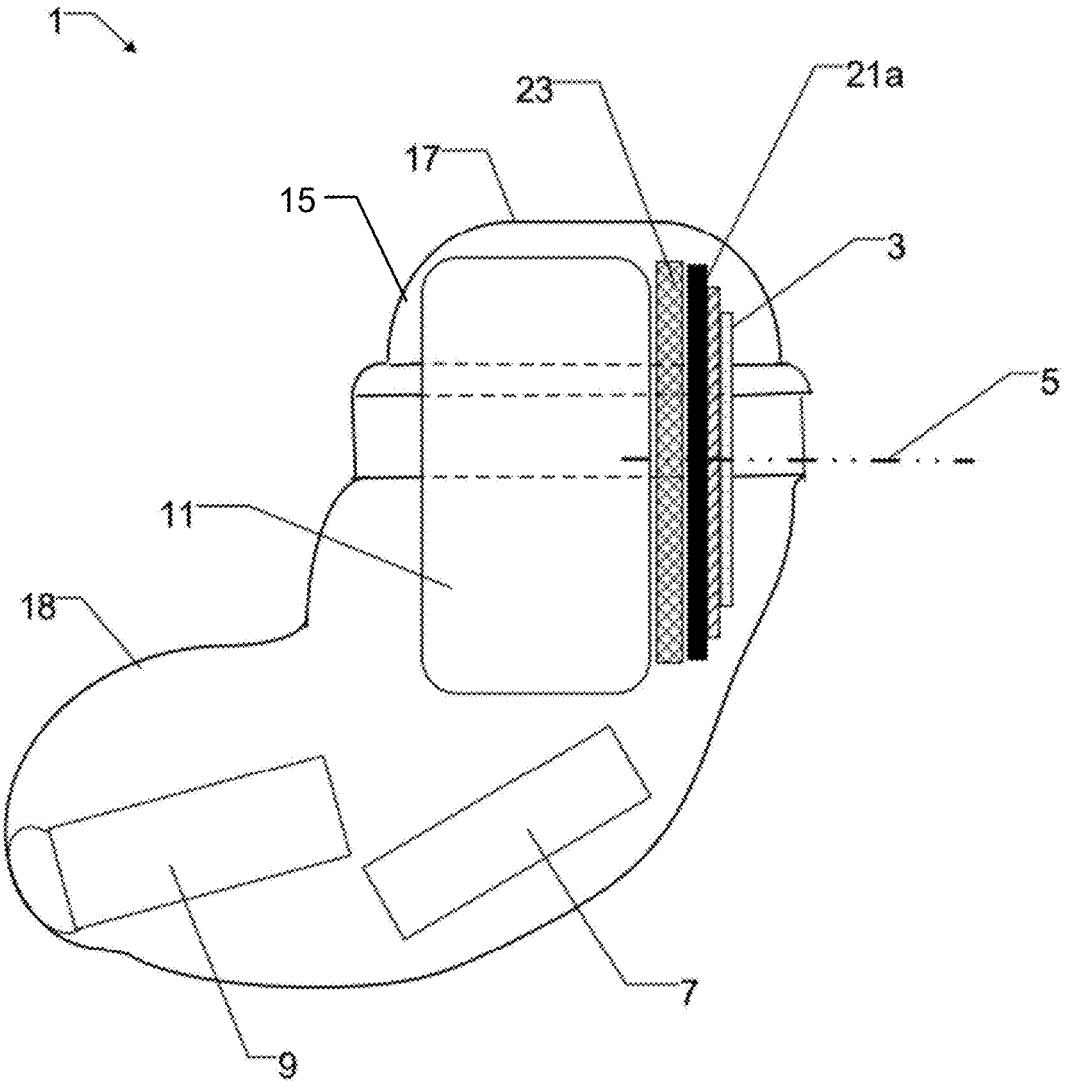

FIG. 6 schematically illustrates a wirelessly rechargeable hearing device 1 according to some embodiments, wherein the first magnetic component 23 is positioned in-between the receiver coil 3 and the rechargeable battery 11, and configured such that it can engage magnetically with a second magnetic component in a charger in a direction that is parallel to, or close to being parallel to, the coil axial centreline 5 of the receiver coil 3, which is the direction of optimal induction coupling. The first magnetic component 23 may be a first attachment interface and the second magnetic component may be a second attachment interface. In the embodiment shown in FIG. 6 the battery 11 may be a button cell battery and the receiver coil 3 is placed adjacent to a terminal of the rechargeable battery 11, where the battery is placed with its side to, such as parallel to and/or adjacent to, the faceplate surface 17. I.e. the first magnetic component 23 is positioned in-between the back surface of the receiver coil 3 and the rechargeable battery 11. The battery 11, the first magnetic component 23 and the receiver coil 3 may be partly placed in respectively the faceplate 15 and the in-ear part 18 of the hearing device 1. The battery 11 and/or first magnetic component 23 and/or receiver coil 3 may be attached to the faceplate 15 of the hearing device 1. The battery 11 and/or the first magnetic component 23 and/or the receiver coil 3 may be positioned and/or attached/fixed in a predefined position in the faceplate 15 of the hearing device 1.

An advantage of this sandwich construction of the first magnetic component 23 and the induction coil 3 is its compactness, which makes it particularly useful in smaller hearing devices 1. Additionally, the function of the receiver coil magnetic shielding 21a may be performed by the first magnetic component 23, so that a single element provides both beneficial functions, see also FIG. 8. Further, the first magnetic component 23 is configured to attract, and/or be attracted by, a second magnetic component in the charger, and the magnetic engagement acts to pull the two induction coils towards each other, thus aiding in the placement and alignment of the two induction coils for inductive charging.

However, the sandwich construction of the first magnetic component 23 and the induction coil 3 may cause "noise" in the charging field due to the static magnetic field between the first magnetic component 23 and a second magnetic component 29 in a charger 25. Advantageously, the induction coils used in these embodiments could be configured according to the NFC standard, wherein the charging is more robust against such "noise". Further, the first and second magnetic components 23 and 29 may be configured to have a weaker magnetic field in an area around the coil axial centreline 5 to reduce noise in the charging field caused by the magnetic field from the components 23, 29 as exemplified in the description of FIG. 7.

Figure 7:
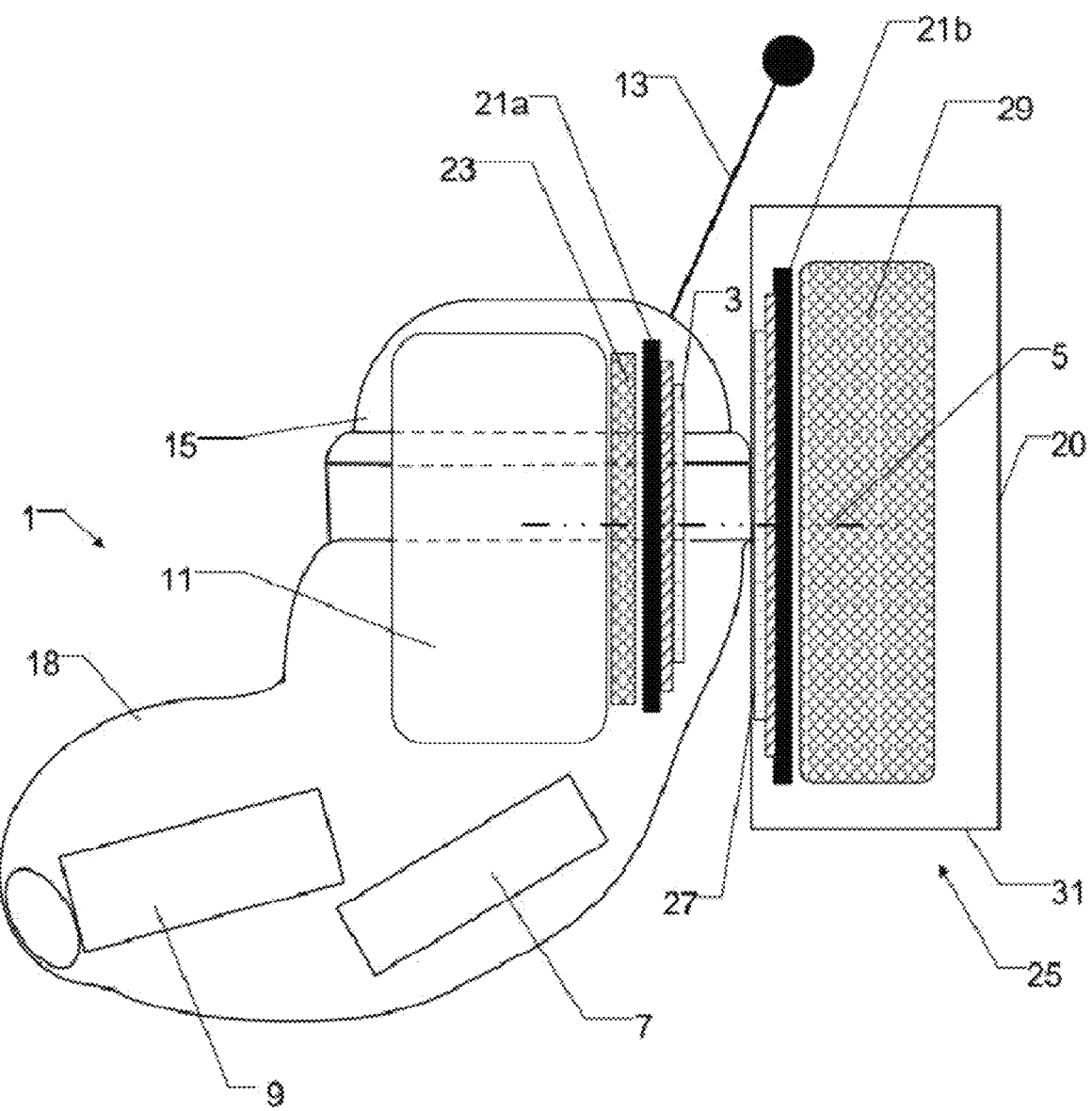

FIG. 7 schematically illustrates a wirelessly rechargeable hearing device 1 placed at or in a charger 25 for a wirelessly rechargeable hearing device. The hearing device 1 may be a hearing device 1 similar to the hearing device shown in FIG. 6.

The hearing device 1 has a first magnetic component 23, which is positioned in-between the receiver coil 3 and the rechargeable battery 11, and which is configured such that it can engage magnetically with a second magnetic component 29 in the charger 25 in a direction that is parallel to, or close to being parallel to, the coil axial centreline 5 of the receiver coil 3. The first magnetic component 23 may be a first attachment interface and the second magnetic component 29 may be a second attachment interface. The second magnetic component 29 in the charger 25 is similarly configured such that it can engage magnetically with the first magnetic component 23 in the hearing device 1 so as to pull at each other in a direction that is parallel to, or close to being parallel to, the coil axial centreline 5 of the transmitter coil 27. Advantageously, with this configuration the magnetic force between the first and second magnetic components 23, 29 in the hearing device 1 and in the charger 25 acts to pull the two induction coils together in the direction of induction coupling.

The magnetic force between the first and second magnetic components 23, 29 may have rotational symmetry, e.g. around the coil axial centreline 5 of the induction coils, for example by one magnetic component being a permanent magnet and the other a magnetic material, or if both are permanent magnets arranged so as to have opposite magnetic poles pointing towards each other.

Alternatively, the magnetic force between the first and second magnetic components 23, 29 could lack rotational symmetry when the hearing device 1 is placed at or in the charger 25 as shown in FIG. 7. For example, both the first and second magnetic components 23, 29 could be permanent bar magnets arranged with their magnetic poles pointing in directions close to parallel such that the magnetic north of one magnet attracts the magnetic south of the other magnet, while the magnetic norths of the two magnets will repel each other, i.e. with the bar magnets arranged in antiparallel. Thus, the bar magnets are placed in parallel with the induction coils 3, 27, i.e. perpendicular to the coil axial centreline 5. Advantageously, in such an arrangement the magnetic field line density in the space between the bar magnets is lower, while it is higher near the poles, which means that the magnetic field from the bar magnets 23, 29, which can cause noise in the charging field, is lower in the charging space between the induction coils 3, 27. A similar configuration to remove rotational symmetry may be used in other embodiments.

Figure 8:
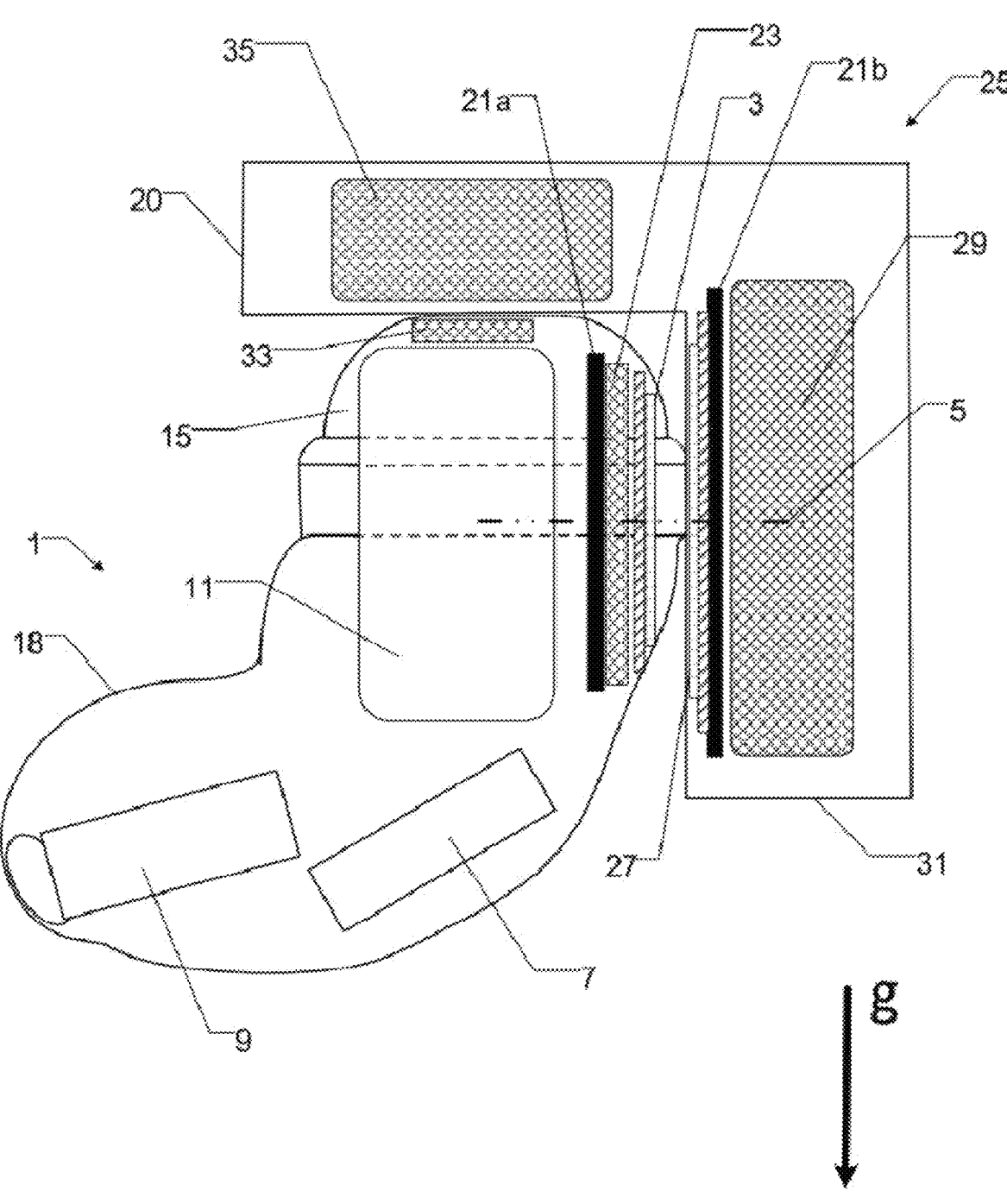

FIG. 8 schematically illustrates a wirelessly rechargeable hearing device 1, such as an in-ear hearing device, placed at or in a charger 25 for a wirelessly rechargeable hearing device in accordance with some embodiments. The charger 25 has an L-shaped casing similar to the charger in FIG. 5.

As in the embodiment shown in FIG. 7, the hearing device 1 has a first magnetic component 23, which is positioned in-between the receiver coil 3 and the rechargeable battery 11, and which is configured such that it can engage magnetically with a second magnetic component in the charger 25 in a direction that is parallel to, or close to being parallel to, the coil axial centreline 5 of the receiver coil 3. The first magnetic component 23 may be a first attachment interface and the second magnetic component may be a second attachment interface. A second magnetic component 29 in the charger 25 is similarly configured such that it can engage magnetically with the first magnetic component 23 in the hearing device 1 in a direction that is parallel to, or close to being parallel to, the coil axial centreline 5 of the transmitter coil 27. In contrast to the embodiment shown in FIG. 7, the receiver coil magnetic shielding 21a is placed behind the first magnetic component 23 to make a "shielding-magnetic component-coil" sandwich construction.

The hearing device 1 in FIG. 8 has a further magnetic component, a third magnetic component 33, which is positioned in the faceplate 15 and which can magnetically engage with a further magnetic component in the charger 25, a fourth magnetic component 35. Having more than one magnetic component in the hearing device 1 and/or in the charger 25 may provide advantages such as even better positioning for the induction charging, a stronger hold on the hearing device 1 in the charger 25, etc.

The magnetic components in the hearing device 1 or those in the charger 25, do not need to be the same type, but could be configured according to their primary function. For example, the third and fourth magnetic components 33, 35 could both be permanent magnets to provide a strong hold of the hearing device 1 against gravity (arrow marked g), while the first magnetic component 23 could be a plate of magnetic material, i.e. not a magnet itself, and the second magnetic component 29 a weaker permanent magnet as the magnetic force does not need to be strong enough to hold the weight of the hearing device 1 in place at or in the charger 25, but merely strong enough to keep the induction coils positioned for charging. Advantageously, in such an arrangement the magnetic field line density in the space between the first and second magnetic components 23, 29, which is also at least in part the conductive charging space, can be configured to be lower than if the magnetic engagement between the first and second magnetic components 23, 29 has to be strong enough to hold the weight of the hearing device 1, thereby reducing the noise caused by the magnetic fields.

Generally, the first and second magnetic components 23, 29 do not need to be placed "behind" the induction coils 3, 27, i.e. on the side not facing towards the other induction coil, but could for example be placed around or "in front" of the induction coils. For example, one or both of the first and second magnetic component(s) 23, 29 could be ring-shaped and be placed such that the induction coil 3, 27 is positioned within the ring. In all embodiments, there is a trade-off that will need to be resolved between positioning versus available space, and between the magnetic field created by the magnetic components and its possible disruption of the induction charging process. An advantage of using induction coils configured according to the NFC standard in embodiments of the wirelessly rechargeable hearing device 1 is that this configuration is better able to handle "noise", such as the noise from a static magnetic field created by one or more of the magnetic components 23, 29, 33, 35.

Figure 9:
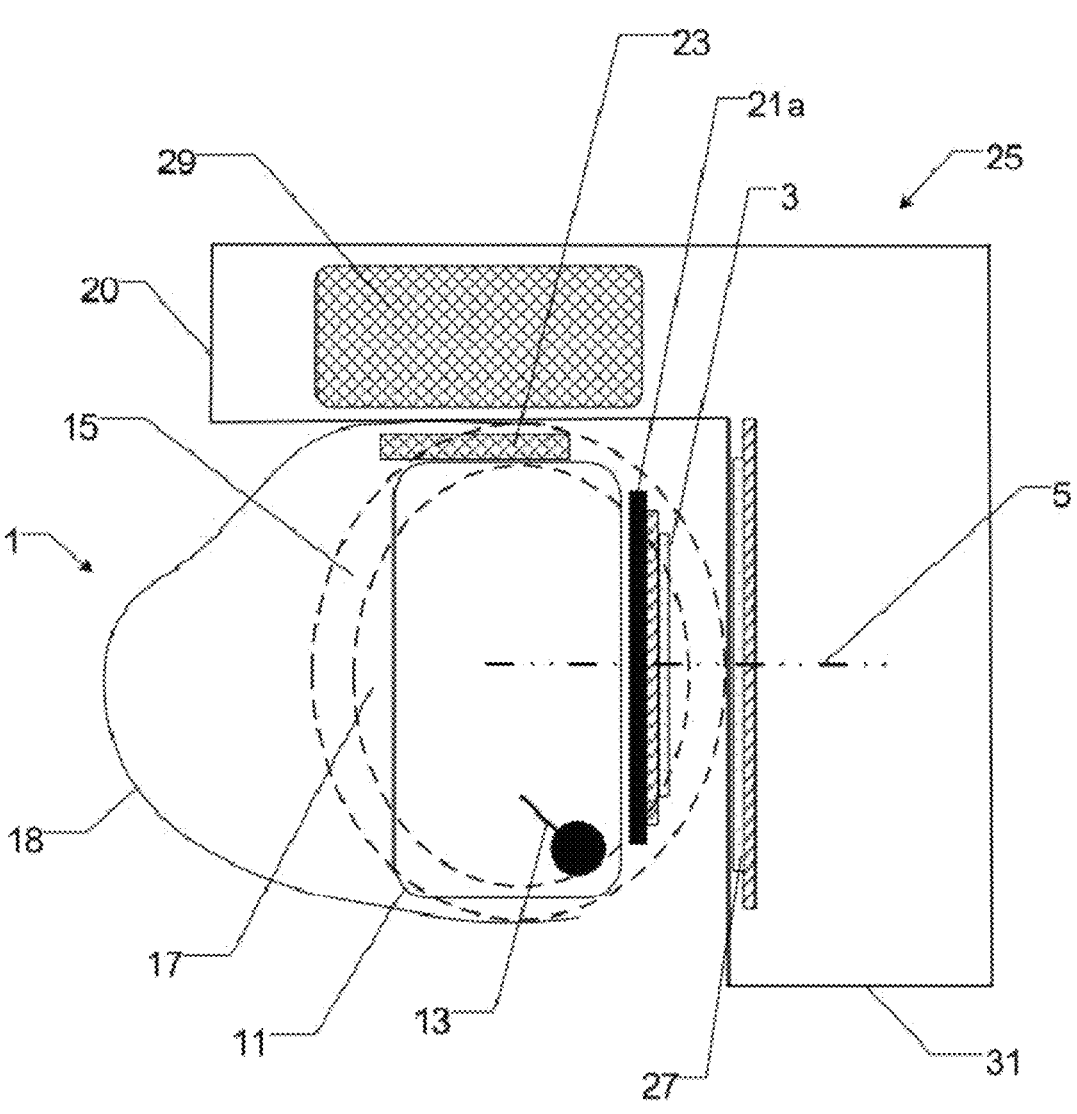

FIG. 9 schematically illustrates a wirelessly rechargeable hearing device 1 placed at or in a charger 25 for a wirelessly rechargeable hearing device in accordance with some embodiments. The hearing device 1 is an in-ear hearing device and is seen from a direction that is normal to the faceplate 15 looking directly at the faceplate surface 17.

The faceplate 15 will, in some models of in-ear hearing devices, comprise one or more microphone openings and possibly buttons, switches, etc. with which the user can interact with the hearing device, for example to change settings and/or turn the hearing device on/off. In contrast, the hearing device sidewalls 19 will usually not contain buttons or switches as these would often be difficult for the user to reach when the in-ear hearing device is in place in the user's ear canal. Further, an in-ear hearing device 1 may have a means for aiding the user in the removal of the in-ear hearing device 1, e.g. a pull-out wire 13.

For such a hearing device 1 it may not be possible, or at least not desirable, to place the faceplate surface 17 against a surface of a charger casing due to the buttons, wire, etc. sticking out, when the hearing device 1 is to be recharged. A solution to this is to have the magnetic coupling between the magnetic components act primarily thorough a sidewall of the hearing device 1.

In the embodiment shown in FIG. 9, the first magnetic component 23 is positioned adjacent to a side of the button cell rechargeable battery 11, and adjacent to a hearing device sidewall, while the receiver coil 3 is positioned adjacent to a terminal of the rechargeable battery 11, where the button cell battery 11 is positioned with its side towards the faceplate surface 17. Thus, as in the hearing device 1 embodiment shown in FIG. 1, the first magnetic component 23 is in a suitable position for it to be configured to be able to engage magnetically with the magnetic component 29 in the charger in a direction that is perpendicular, or close to being perpendicular, to the coil axial centreline 5 of the receiver coil 3, i.e. perpendicular to, or close to perpendicular to, the direction of optimal induction coupling.

Figure 10:
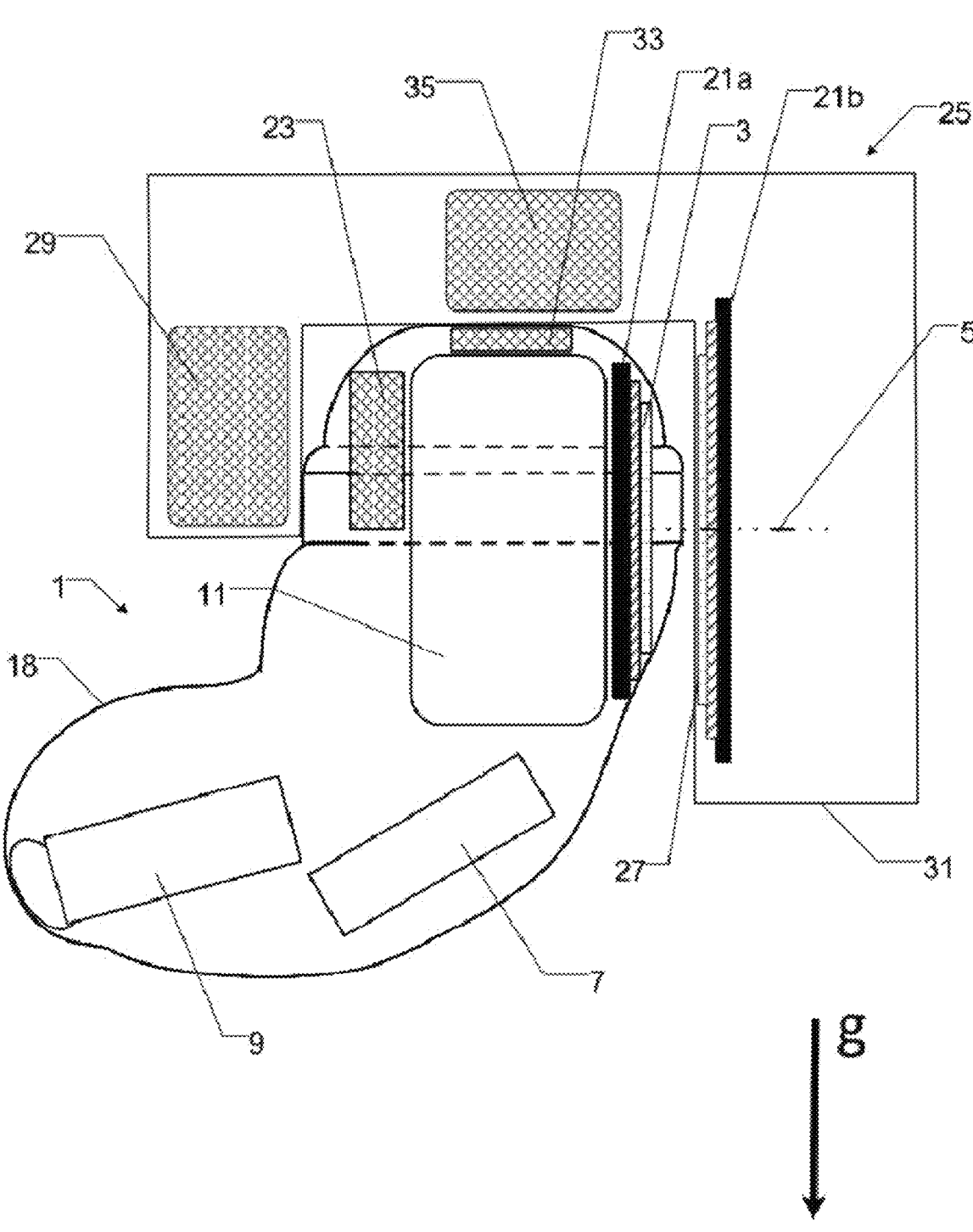

FIG. 10 schematically illustrates a wirelessly rechargeable hearing device 1, such as an in-ear hearing device, placed at or in a charger 25 for a wirelessly rechargeable hearing device in accordance with some embodiments. The charger 25 is similar to the embodiment shown in FIG. 8 in that both the hearing device 1 and the charger 25 each have two magnetic components 23, 29, 33, 35.

In contrast to the embodiment shown in FIG. 8, the charger 25 has a U-shaped charger casing 31 with the transmitter coil 27 positioned in one leg, the second magnetic component 29 positioned in the other leg and the fourth magnetic component 35 positioned in a middle section between the two legs. The two legs may in this embodiment be parallel to each other or approximately parallel to each other. Furthermore, the first magnetic component 23 is not placed adjacent to the receiver coil 3, and in-between the receiver coil 3 and the rechargeable battery 11, but instead on the opposite side of the battery 11, so that the battery is in-between the receiver coil 3 and the first magnetic component 23. Furthermore, the first magnetic component 23 and/or the third magnetic component is mainly placed in the faceplate 15 of the hearing device 1.

In this configuration, the possible adverse effect of the magnetic components is diminished as none of the magnetic components are placed close to the induction coils 3, 27. Further, a receiver coil magnetic shielding 21a is positioned next to the receiver coil 3 and may be further configured to diminish the effects of the magnetic components 23, 29, 33, 35 on the induction coils 3, 27 and the charging field.

The magnetic components in the hearing device 1 or those in the charger 25, do not need to be the same type, but could for example be configured according to their primary function. For example, the third and fourth magnetic components 33, 35 could both be permanent magnets to provide a strong hold of the hearing device 1 against gravity, while the first magnetic component 23 could be a plate of magnetic material, i.e. not a magnet itself, and the second magnetic component 29 a weaker permanent magnet as the magnetic force does not need to be strong enough to hold the hearing device 1 in place in the charger 25, but merely strong enough to keep the induction coils positioned for charging.

In an alternative embodiment, one or both of the first and second magnetic components 23, 29 could be permanent magnets to provide a strong hold of the hearing device 1 against gravity and the third and fourth magnetic components 33, 35 may be omitted.

Figure 11:
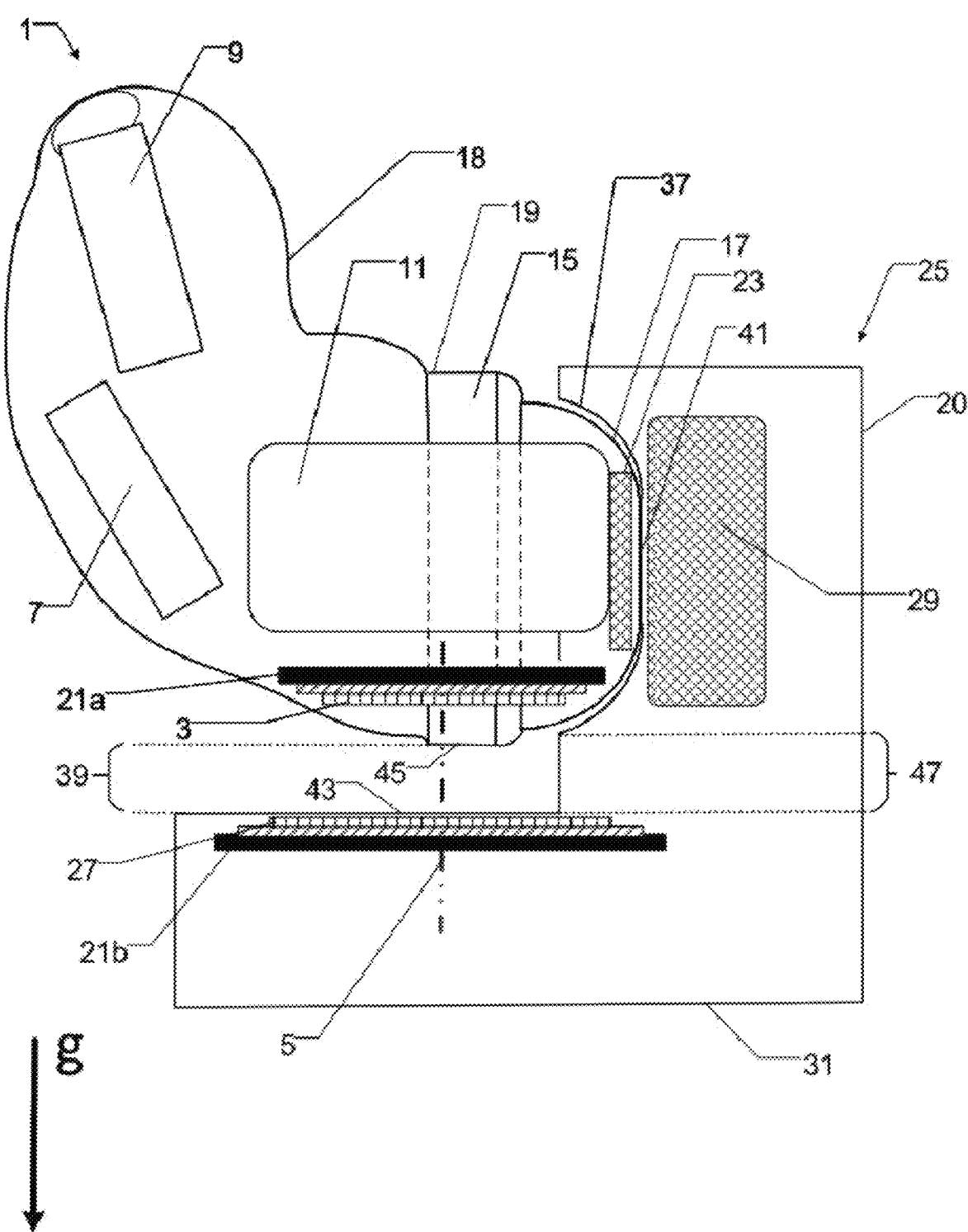

FIG. 11 schematically illustrates a wirelessly rechargeable hearing device 1, such as an in-ear hearing device, placed at or in a charger 25 for a wirelessly rechargeable hearing device in accordance with some embodiments. The hearing device 1 and charger 25 are similar to the embodiments in FIG. 5, but instead of a charger 25 that may be suitable for example for hanging on a wall, the charger in FIG. 11 is illustrated as a base charger, which rests on a surface.

The charger 25 is L-shaped and has an indentation 37 in one of the legs in which part of the hearing device 1, in FIG. 11 part of the faceplate 15, fits. The first and second magnetic components 23, 29 are positioned such that the magnetic force primarily acts through an indentation charger surface 41 within the indentation 37 and through the faceplate surface 17. The first magnetic component 23 may be a first attachment interface and the second magnetic component 29 may be a second attachment interface.

In this configuration of the charger 25, the user is further aided in the placement of the hearing device 1 in the charger 25 by the indentation. A part of the hearing device 1 may be able to rest against a sidewall of the charger casing 20, e.g. such as against a part of the indentation charger surface 41 in the indentation 37 and/or against another sidewall of the charger 25, such as against the charger gap sidewall 43, which is discussed below. In such as configuration, where part of the hearing device 1 is at least partly resting on a surface of the charger 25, the magnetic force generated by the magnetic components 23, 29 need not be strong enough to hold the weight of the entire hearing device 1 against gravity.

The charger 25 may be configured to work with a plurality of hearing devices 1 such as different types of hearing devices 1, or different customizations of a hearing device 1. For example, the charger 25 shown in FIG. 11 is configured to work with a plurality of custom hearing devices, which are each individually shaped to fit a particular user. Such customization results in the different custom hearing device 1 having different sizes and/or shapes of at least part of the hearing device 1, often in particular some of the in-ear part 18 that sits entirely in the users ear canal EC during use, e.g. the hearing device sidewalls 19 and/or the faceplate surface 17 may be shaped at least partially after the users ear canal EC. Standardizing a charger 25 for use with custom hearing devices 1 therefore requires a design whereby larger-sized custom hearing devices fit within the charger 25, while the charger 25 must still also work with the smaller-sized hearing devices. This may be achieved by having the charger 25 configured such that for some hearing devices 1, when placed in or at the charger for charging, there will be a gap 39 between a hearing device gap sidewall 45 and a charger gap sidewall 43 to allow for hearing devices 1 having a different size and/or shape to fit into the same charger 25. In the embodiment in FIG. 11 this is achieved by an indentation height 47 between the charger gap sidewall 43 and the indentation 37. The size of the indentation height 47 may be determined by a study of fit customizations already performed, i.e. based on known shapes on custom hearing devices. For example, the fit study could be done to ensure that even the biggest hearing devices will be able to fit in the charger 25, such as the L-shaped charger 25 of FIG. 11 or the U-shaped charger 25 of FIG. 10. However, to obtain a smaller and/or a more aesthetically pleasing charger, the design of the charger 25 may alternatively neglect some of the largest previously produced custom hearing devices in the fit study such that the end-product charger 25 will only fit some, preferably most, but not all the previously produced custom hearing devices.

Figure 12:
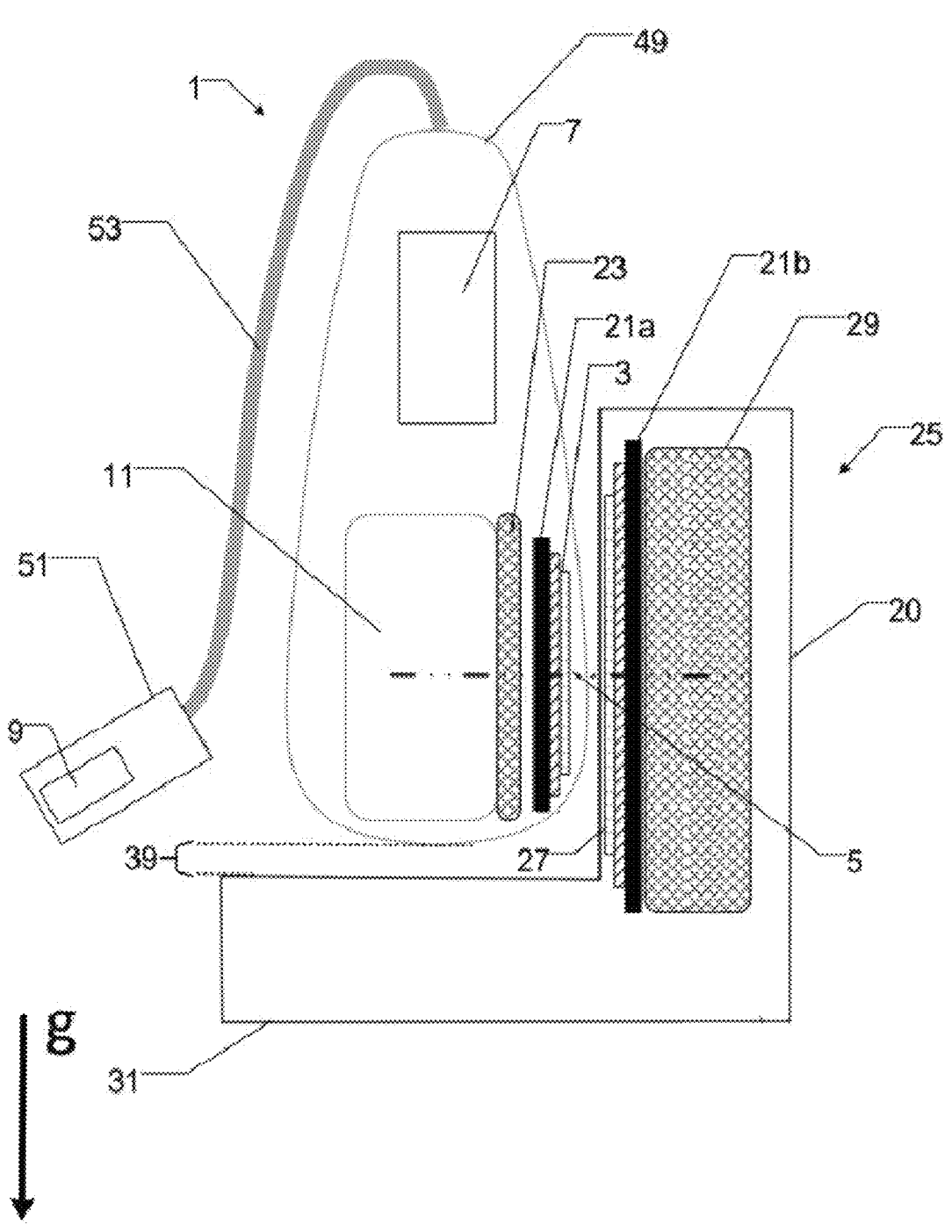

FIG. 12 schematically illustrates a wirelessly rechargeable hearing device 1 placed at or in a charger 25 for a wirelessly rechargeable hearing device in accordance with some embodiments. The hearing device 1 is a hearing device primarily worn on the outside of the user's ear. It has a behind-the-ear part 49 made to be positioned behind the ear of the user, an in-the-ear part 51 positioned within the ear of the user during use, and a tube 53 connecting the behind-the-ear part 49 and the in-the-ear part 51. The hearing device may be a hearing aid and may be one of the hearing aids known as a receiver-in-ear (RIE), a microphone-and-receiver-in-ear (MaRIE), or a behind-the-ear (BTE) hearing aid. The drawing illustrates both the outline of the hearing device 1 as well as some of the internal components in a partially transparent view.

To protect the components within the hearing device 1, the hearing device 1 is designed to keep out ear wax, dirt, water, oil etc. The behind-the-ear part 49 is made up of one or more hearing device sidewalls 19, which are sealed so as to keep out dirt, water, sweat, oil, etc., and the part of the in-the-ear part 51, which sits in the user's ear during use, must additionally be designed to withstand the environment of the ear and the ear canal, which comprises e.g. ear wax.

The behind-the-ear part 49 will have one or more microphone openings and possibly buttons, switches, etc. with which the user can interact with, for example to change settings and/or turn the in-ear hearing device 1 on/off. Thus, in contrast to in-ear hearing devices, the one or more hearing device sidewalls 19 of the type of hearing device 1 of FIG. 12 may contain microphones, buttons, switches, etc.

The hearing device 1 has hearing device components arranged within the behind-the-ear part 49, such as electronics 7, where the electronics 7 may be electronic components and circuits that create, process, and/or cancel audible sound. The receiver 9, and possibly one or more microphones, is arranged in the in-the-ear part 51 such that it is close to the eardrum ED of the user when the in-the-ear part 51 is inserted into the user's ear canal EC. Additionally, the in-the-ear part 51 may also comprise electronics 7.

To supply power to electronic components 7 within the hearing device 1, the hearing device 1 has a rechargeable battery 11, which is recharged by inductive charging. To this end, the hearing device 1 has inductive charging circuitry comprising a receiver coil 3 and circuitry for rectifying the alternating current induced in the receiver coil 3 during operation. The receiver coil 3 is comprised of a copper layer (horizontal line pattern) on a PCB (angled line pattern) with a receiver coil magnetic shielding 21a (black rectangle) made of e.g. ferrite. The receiver coil magnetic shielding 21a acts to concentrate the magnetic field created during induction to the inductive coil instead of wasting energy, e.g. by heating of the surrounding components such as the battery 11. Further, a magnetic shielding may be positioned and configured such that the potential adverse effect of the magnetic flux on other components of the hearing device is diminished. A transmitter coil magnetic shielding 21b may similarly be placed in relation to a transmitter coil 27 in a charger 25 for the wirelessly rechargeable hearing device 1.

The charger 25 has inductive charging circuitry with a transmitter coil 27, which is configured to be able to inductive couple to the receiver coil 3 in the hearing device 1. The transmitter coil 27 is comprised of a copper layer (horizontal line pattern) on a PCB (angled line pattern) with a transmitter coil magnetic shielding 21b (black rectangle) made of e.g. ferrite. The induction coils 3, 27, i.e. the receiver coil 3 and the transmitter coil 27, will be configured to operate at one or more frequency ranges and they may be configured according to a standard of wireless power transfer, such as e.g. the Near Field Communications (NFC) standard, or the Qi® standard. An advantage of using induction coils configured according to the NFC standard is that this configuration is better able to handle "noise", such as the noise from a static magnetic field created by one or more of the magnetic components 23, 29. Both the receiver coil 3 and the transmitter coil 27 are positioned close to an outer surface so they can get close enough to each other to allow for efficient wireless charging.

To facilitate reproducible placement of the hearing device 1 in or at the charger 25 such that the induction coils 3, 27 are aligned sufficiently for induction charging, the hearing device 1 has a first magnetic component 23 and the charger has a second magnetic component 29. The first magnetic component 23 may be a first attachment interface and the second magnetic component 29 may be a second attachment interface. The first and second magnetic components 23, 29 are configured to magnetically engage with each other. The first magnetic component 23 may, for example, be a magnet, and the second magnetic component 29 in the charger 25 could be a magnetic material or it could also be a magnet. If the first magnetic component 23 is not magnetic itself, the second magnetic component 29 in the charger 25 alone will have to provide the magnetization necessary for the two components to magnetically engage. The first and second magnetic components 23, 29 may be any suitable shape e.g. a bar, a rectangular plate, or a disc.

In the embodiment shown in FIG. 12, the first and second magnetic component 23, 29 are configured such that they will attract each other. The first magnetic component 23 and the receiver coil 3 are positioned adjacent to the rechargeable battery 11 in a sandwich construction with the first magnetic component 23 positioned in-between the battery 11 and the receiver coil 3. The second magnetic component 29 in the charger 25 is likewise positioned "behind" the transmitter coil 27 with respect to the wireless charging space in-between the two induction coils 3, 27.

Thus, the magnetic engagement acts to pull the two induction coils towards each other, aiding in the placement and alignment of the two induction coils for inductive charging. However, the sandwich construction of a magnetic component 23, 29 and an induction coil 3, 27 may cause "noise" in the charging field due to the static magnetic field between the first and second magnetic components 23, 29. Advantageously, the induction coils used in these embodiments could be configured according to the NFC standard, wherein the charging is more robust against such "noise". Further, the magnetic components 23 and 29 may be configured to have a weaker magnetic field in an area around the coil axial centreline 5 to reduce noise in the charging field caused by the magnetic field from the first and second magnetic components 23, 29, for example the magnetic components 23, 29 may be ring-shaped with a hole inside, the ring being centred on or close to the axial centrelines of the induction coils 3, 27.

In the embodiment shown in FIG. 12, the charger 25 has an L-shaped charger casing 31 with the transmitter coil 27 and the second magnetic component 29 positioned in one leg, while the other leg may form a stand to allow the charger 25 to be positioned on a surface, e.g. on a table or shelf. Alternatively, or additionally, the charger 25 may be configured for placement on a wall. The two legs may in this embodiment be perpendicular to each other or approximately perpendicular to each other. When the hearing device is placed in or close to the corner, i.e. the inner corner, of the two legs of the charger, the first and second magnetic components 23, 29 magnetically engage, which aids the user in correct, reproducible placement of the hearing device at or in the charger such that the induction coils are in position for wireless charging.

The magnetic force between the first and second magnetic components 23, 29 may be strong enough to hold the hearing device 1 against gravity (arrow marked g), e.g. such that the hearing device 1 can "hang" in the charger 25 with a gap 39 between the hearing device 1 and a part of the charger. An advantage of this type of "open" construction charger, which is minimally shaped to the shape of a hearing device 1, is that it can more easily be designed to be used with a plurality of hearing devices of different types. For example, the same charger may be used for different models of hearing devices, such as different types of hearing devices worn primarily on the outside of the user's ear, and/or the charger may be configured to also work with in-ear models of hearing devices.

If the magnetic engagement between the first and second magnetic components 23, 29 allows the hearing device 1 to be positioned in the charger 25 in multiple ways the hearing device 1 and charger 25 may have an indicator to further aid the user in reproducibly placing the hearing device 1 correctly in the charger 25.

Figure 13:
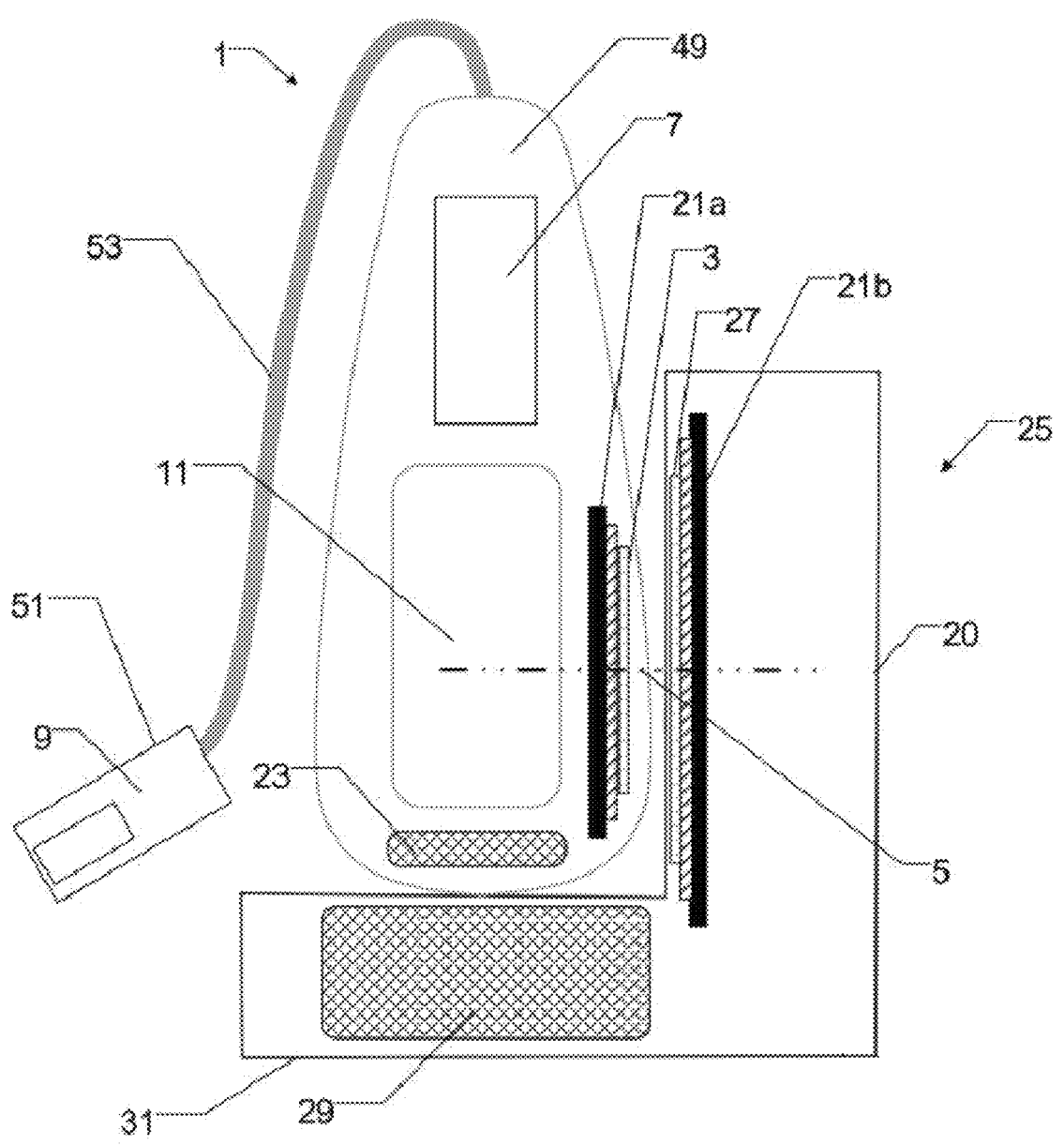

FIG. 13 schematically illustrates a wirelessly rechargeable hearing device 1 placed at or in a charger 25 for a wirelessly rechargeable hearing device in accordance with some embodiments. The hearing device 1 is a hearing device primarily worn on the outside of the user's ear similar to the hearing device shown in FIG. 12. However, the hearing device 1 shown in FIG. 13 has the first magnetic component 23 positioned such that it is perpendicular, or close to perpendicular, to the coil axial centreline 5 of the receiver coil 3, i.e. perpendicular to, or close to perpendicular to, the direction of optimal induction coupling. An advantage of this configuration of the magnet engagement and the induction coupling is that it simplifies configuration of the magnetic components and induction coils to ensure that the effects of the magnetic flux from the magnetic components does not significantly diminish the efficiency of the induction charging.

This configuration of the receiver coil 3 and the first magnetic component 23 in the hearing device 1 poses design requirements on the charger 25 for the hearing device 1. In the embodiment shown in FIG. 13, the charger 25 is an L-shaped charger similar to the charger shown in FIG. 12, but with the transmitter coil 27 in one leg and second magnetic component 29 in the other leg of the charger 25. The first and second magnetic components 23, 29 are configured such that they will attract each other.

If the magnetic engagement between the first and second magnetic components 23, 29 allows the hearing device 1 to be positioned in the charger 25 in multiple ways the hearing device 1 and charger 25 may have an indicator to further aid the user in reproducibly placing the hearing device 1 correctly in the charger 25. Alternatively, or additionally, further magnetic components in the hearing device 1 and charger 25 such as a third and a fourth magnetic component may be used to further aid the user in placement of the hearing device 1 in the charger 25.

Figure 14:
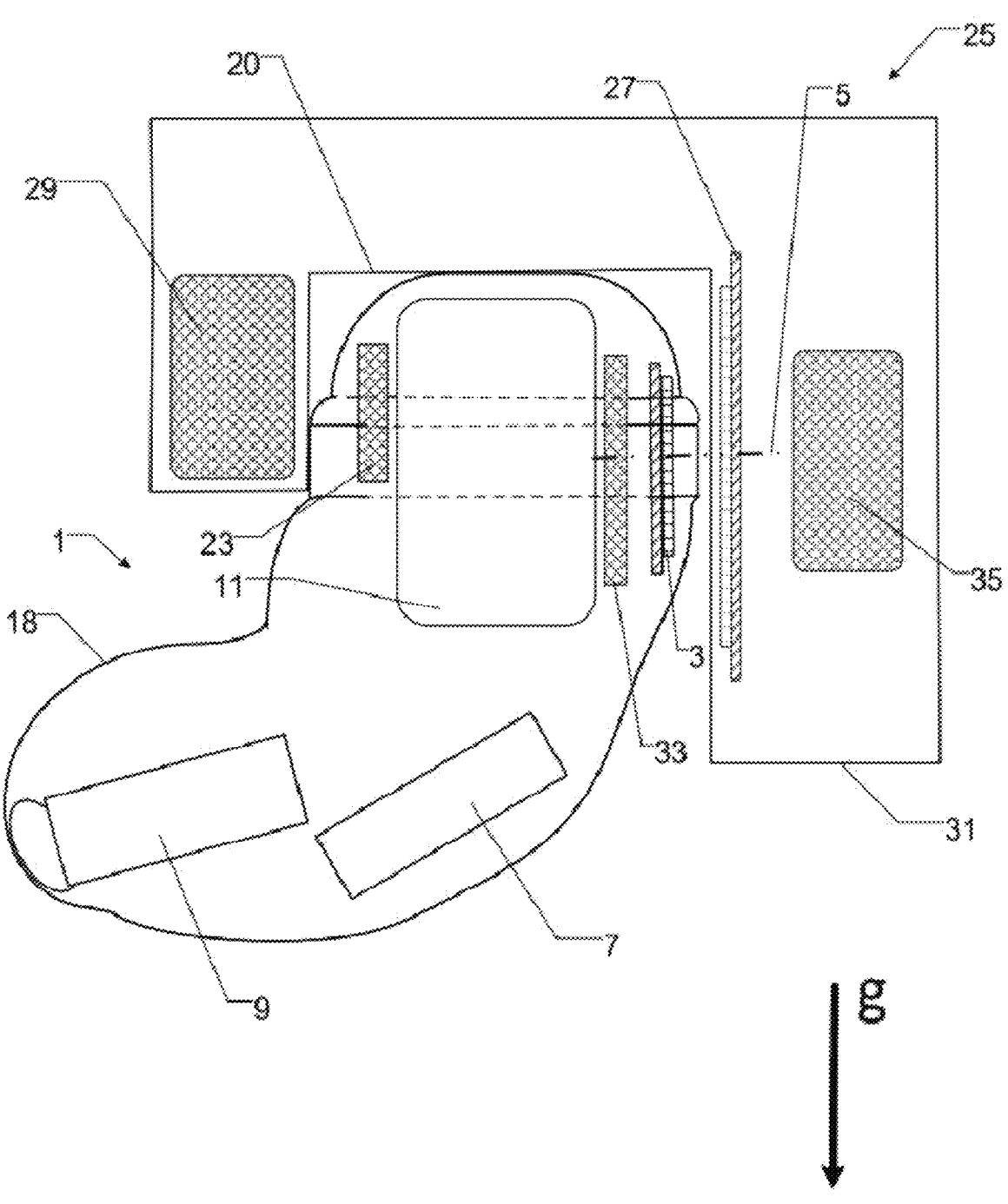

FIG. 14 schematically illustrates a wirelessly rechargeable hearing device 1 placed at or in a charger 25 for a wirelessly rechargeable hearing device in accordance with some embodiments. The hearing device 1 and charger 25 are similar to those shown in FIG. 10 except for the position of the third and fourth magnetic components 33, 35. The third magnetic component 33 is positioned adjacent to the receiver coil 3 and the fourth magnetic component 35 is positioned adjacent to the transmitter coil 27.

In this embodiment, the first and second magnetic components 23, 29 attract each other, the third and fourth magnetic components 33, 35 attract each other, the first 23 and fourth 35 magnetic components repel each other, and the second 29 and third 33 magnetic components repel each other when the hearing device 1 is positioned in the charger 25 with its faceplate towards the middle section of the charger between the two legs. Thus, all four magnetic components 23, 29, 33, 35 are magnets such that they are able to either attract or repel each other depending on their relative positions. The first and second magnetic components 23, 29 can be said to be paired, and likewise the third and fourth magnetic components 33, 35. Thus, there will be an increasing attractive force between the paired magnetic components the more aligned the paired magnets (and thereby the induction coils 3, 27) are, and an increasing repulsion the closer the unpaired magnetic components get to each other.

Alternatively, only three of the four magnetic components 23, 29, 33, 35 have an inherent magnetisation such that they are able to either attract or repel each other depending on their relative positions. For example, the first and second magnetic components 23, 29 may attract each other, the third and fourth magnetic components 33, 35 may attract each other, and the first 23 and fourth 35 magnetic components may repel each other. Either the second magnetic component 29 or the third magnetic component 33 will then be a magnetic material and not a magnet. Compared to the configuration where all four magnetic components 23, 29, 33, 35 are magnets, there will still be an increasing attractive force between the paired magnetic components the more aligned the paired magnets (and thereby the induction coils 3, 27) are, and a repulsion between the unpaired magnets. However, in the same configuration where the repulsion between the unpaired magnets increases, there will also be an attraction between the component that is a magnetic material and a magnet. However, by configuring the relative strengths of the attraction and repulsion the desired net result of facilitating the inductive coupling between the receiver coil 3 and the transmitter coil 27, i.e. aiding in the alignment of the induction coils 3, 27, can be achieved.

In any of the configurations, each pair of magnetic components, i.e. the first and second magnetic components 23, 29, and the third and fourth magnetic components 33, 35, may have or be implemented in the hearing device 1 and the charger 25 such that the magnetic field strength between the components in a pair is different from the magnetic field strength between the components in the other pair, so that e.g. the first and second magnetic components 23, 29 has a stronger magnetic field between them than the third and fourth magnetic components 33, 35. This may additionally aid correct, reproducible placement of the hearing device 1 at or in its charger 25 by pulling the hearing aid 1 towards one of the legs in the U-shaped charger, i.e. in the direction in which the resultant magnetic force is strongest, in FIG. 14 towards the leg of the charger 25 comprising the second magnetic component 29. Alternatively, and in some embodiments preferably, the third and fourth magnetic components 33, 35 may have a stronger magnetic field between them than the first and second magnetic components 23, 29, so that the hearing device 1 is pulled towards the leg of the charger 25 comprising the fourth magnetic component 35.

The larger the two induction coils 3, 27 are, the less significance a deviation from a coaxial alignment has. In an in-ear hearing device 1 as shown in FIG. 14, the size of the receiver coil 3 is to a large degree determined by the available space within the hearing device 1. The transmitter coil 27 in the charger, however, does not have the same severe constraint and advantageously has a larger diameter than the receiver coil 3.

As the in-ear hearing devices 1 are mostly shown as a cut-away illustration perpendicular to the faceplate surface 17 of the stylised in-ear hearing device 1, the magnetic components 23, 29, 33, 35 and the induction coils 3, 27, for ease of illustration, are shown as being in that cut-away plane. However, the magnetic components 23, 29, 33, 35 and the induction coils 3, 27 may be positioned elsewhere and at other angles to the cut-away plane of illustration as long as the relative positions and functions facilitate the inductive coupling between the receiver coil 3 and the transmitter coil 27, i.e. aid in the alignment of the induction coils 3, 27.

Figure 15:
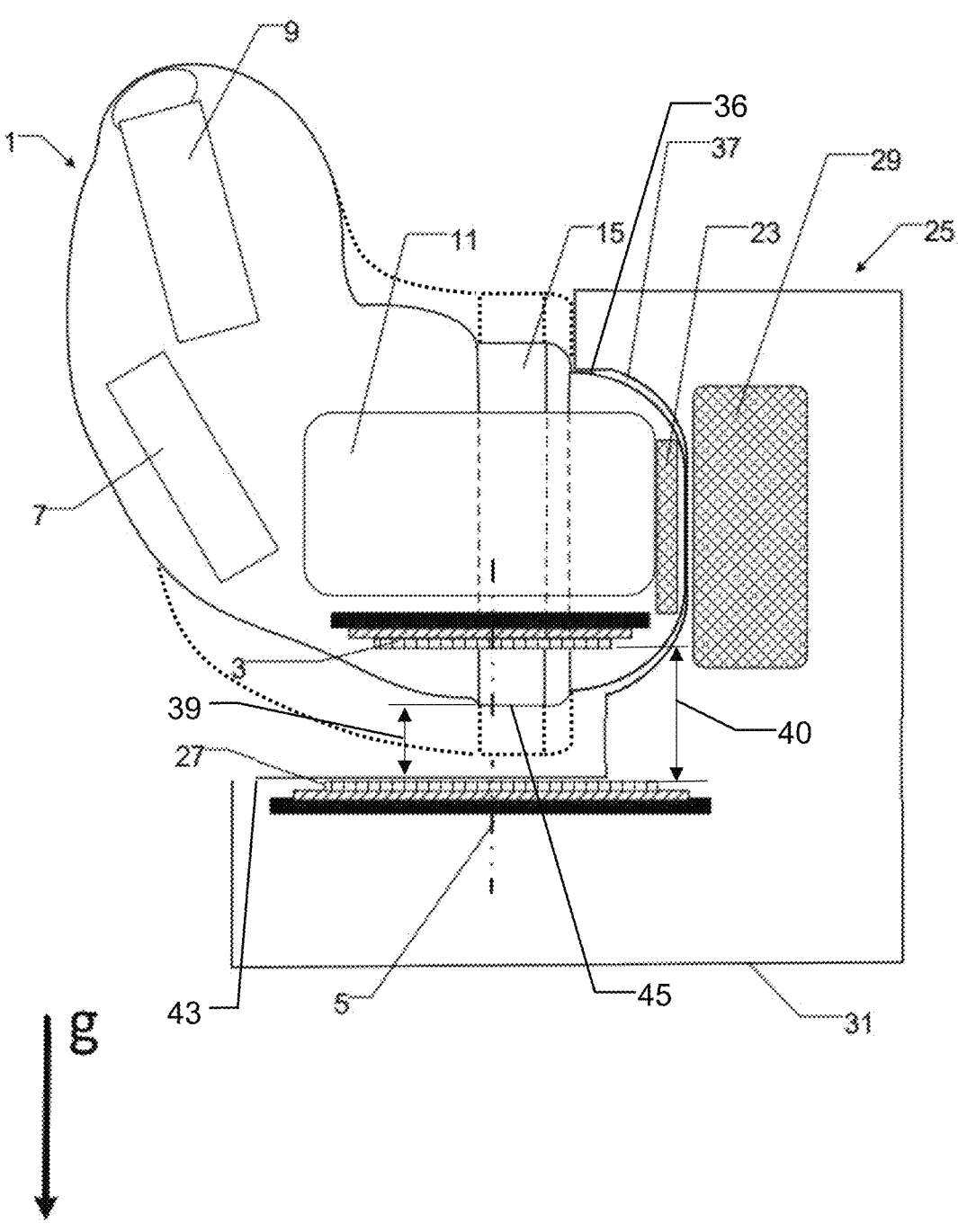
FIG. 15 schematically illustrates a wirelessly rechargeable hearing device placed at or in a charger for a wirelessly rechargeable hearing device in accordance with exemplary embodiments.

FIG. 15 schematically illustrates a wirelessly rechargeable hearing device 1 placed at or in a charger 25 for a wirelessly rechargeable hearing device in accordance with some embodiments. The hearing device 1 and the charger 25 are similar to those shown in FIG. 11 except for that the receiver coil 3 is positioned in the hearing device 1 to have a predefined coil distance 40 to the transmitter coil 27 in the charger 25 when the hearing device 1 is inserted in the charger 25. The predefined coil distance 40 may be measured from a planer surface of the receiver coil 3 facing the transmitter coil 27 to a planer surface of the transmitter coil 27 facing the receiver coil 3. The predefined coil distance 40 may be measured along and axial centreline 5 of the receiver coil 3 and/or transmitter coil 27. As shown by the dotted lines in FIG. 15 hearing devices of the in-ear type, such as in-the-ear (ITE) type, completely-in-canal (CIC) type and/or in-the-canal (ITC) type, may have different shapes and sizes to fit the anatomy of the user's ear. To compensate for the variation in shape and size of different hearing devices 1 of the system the charger 25 is made with a gap 39 between a hearing device gap sidewall 45 and a charger gap sidewall 43 to be able to fit physical both large and small devices. The dotted lines illustrate an example of an extended size of a larger hearing device compared to a smaller hearing device. The predefined coil distance 40 may be obtained by always having the same position of the receiver coil 3 in the faceplate 15. The predefined coil distance 40 may further be obtained by having the same position of the faceplate 15 of the hearing device 1 in the charger 25. Thereby will the predefined coil distance 40 be constant and will not change from hearing device to hearing device.

There is a clear correlation between the size of the induction coils 3, 27 and the distance between the induction coils 3, 27. Rule of Thumb may be that a maximum distance between the induction coils is the ½ diameter of the receiver coil 3. The predefined coil distance 40 may be equal to or below 3 mm. The predefined coil distance 40 may be equal to or below 3.5 mm. Due to production tolerances the predefined coil distance 40 may as an example be set to 3 mm+−0.5 mm.

It is an advantage to have a predefined coil distance 40 between the induction coils 3, 27 being independent on shape and/or size of hearing devices to be placed in the charger, as there is a clear correlation between the charging performance of the induction coils 3, 27, the size of the induction coils 3, 27 and the distance between the induction coils 3, 27. Having the predefined coil distance 40 thereby allow for a controlled charging performance of the charging system.

The first magnetic component 23 may be a first attachment interface and the second magnetic component 29 may be a second attachment interface. A magnet-to-magnet attachment interface such as the first and second magnetic components 23, 29 has a good centering capability to each other and mechanical guiding features are less needed. Thus, the position (e.g., center position) of the induction coils 3, 27 with respect to each other is better controlled (compared to the solution in which only one of the hearing device or the charger has a magnet, and the other one of the hearing device or the charger has a metal part without any magnet). On the other hand, a more precise control of the predefined coil distance 40 may be preferred. A stop 36 may be provided on the charger 25 to provide the predefined coil distance 40. The stop 36 may assure a maximum predefined coil distance 40. It should be noted that the term "magnet-to-magnet attachment interface" is not limited to magnets in physical abutment with each other, and may cover magnets that are magnetically coupled directly or indirectly to each other.

Alternatively, other types of attachment interfaces may be used instead and/or in combination with the first magnetic component 23 and the second magnetic component 29 to facilitate reproducible placement of the hearing device 1 in or at the charger 25 such that the induction coils 3, 27 are aligned sufficiently for induction charging and with a predefined coil distance. Alternative attachment interfaces may be one or more mechanical snap connection between the face plate 15 of the hearing device 1 and the charger 25, such as between the face plate 15 of the hearing device 1 and the indentation 37 in the charger 1, and/or an insert for/in/of the charger 25 see FIGS. 16*a-d.*

Figure 16A:
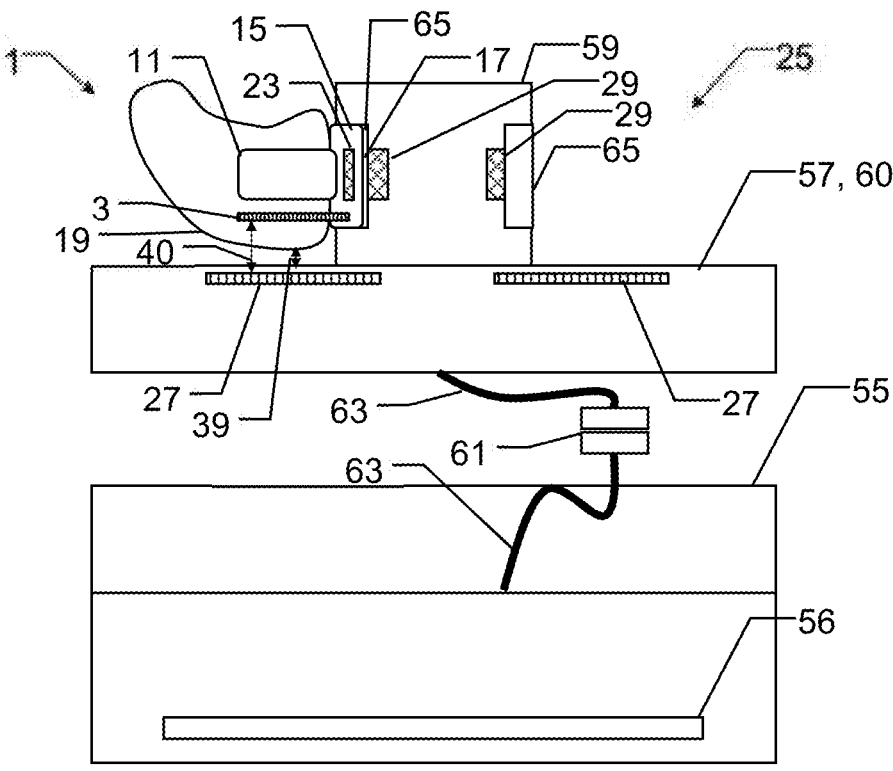
FIGS. 16*a*-16*d* schematically illustrates a wirelessly rechargeable hearing device placed at or in a charger for a wirelessly rechargeable hearing device in accordance with exemplary embodiments.

FIG. 16*a* schematically illustrates a wirelessly rechargeable hearing device 1 placed at or in a charger 25 for a wirelessly rechargeable hearing device. The hearing device 1 comprises a faceplate 15 with a faceplate surface 17, a first magnetic component 23, a rechargeable battery 11 and a receiver coil 3. The receiver coil 3 may comprise a copper layer on a PCB. The receiver coil 3 may further comprise a receiver coil magnetic shielding made of e.g. ferrite. The first magnetic component 23 may be a first attachment interface. The first magnetic component 23 is positioned adjacent to a side of the battery 11, and adjacent to the faceplate surface 17, while the receiver coil 3 is positioned adjacent to a terminal of the rechargeable battery 11, and adjacent to a hearing device sidewall 19. I.e., the first magnetic component 23 is positioned between the side of the battery 11 and the faceplate surface 17, while the receiver coil 3 is positioned between the terminal of the battery 11 and the hearing device sidewall 19. The hearing device 1 is in the illustrated example a completely-in-canal (CIC) type hearing device 1 but could as well be an invisible-in-canal (IIC), in-the-canal (ITC), or in-the-ear (ITE) type hearing device.

The charger 25 comprises a charger base 55 and an insert 57. The charger base 55 may be used with different types of hearing devices 1. The insert 57 may be adapted to the type of hearing device 1. The insert 57 may be one of different types of inserts configured for being used in/with the charger 25, wherein each insert is adapted to a specific type of hearing devices. Each insert 57 thereby mechanically adapt the charger 25 to be used with a specific type of hearing device among a group of different types of hearing devices. The insert 57 may be adapted to be used with different sizes and shapes of a particular type of hearing devices. The charger base 55 may further comprise a Printed Circuit Board (PCB)/Printed Circuit Board Assembly (PCBA) 56. The insert 57 may be electrically connected to the charger base 55 through electrical wires 63 and a connector 61. The insert 57 comprises one or more transmitter coils 27 and one or more second magnetic components 29. The one or more transmitter coils 27 may each comprise a copper layer on a PCB. The one or more transmitter coils 27 may each further comprise a transmitter coil magnetic shielding made of e.g. ferrite. The one or more second magnetic components 29 may be a second attachment interface. The electrical wires 63 and the connector 61 may connect the one or transmitter coils 27 in the insert 57 with the PCB/PCBA 56 in the charger base 55. The insert 57 comprises an insert base 60 and a tower 59. The insert base 60 and the tower 59 may be one integrated part or two separate parts attached to each other. The one or more second magnetic components 29 are arranged in the tower 59 of the insert 57 and the one or more transmitter coils 27 are arranged in the insert base 60. The tower 59 further comprises an indentation 65 for receiving the faceplate 15 of the hearing device 1. The tower 59 may comprise two indentations 65, each for receiving the faceplate 15 of a hearing device 1 of a pair of hearing devices. The two indentations 65 may be arranged at opposite sides of the tower 59. The one or more second magnetic components 29 may be arranged between the two indentations 65. The charger may comprise two second magnetic components, wherein a second magnetic component is arranged at/in the bottom of at each indentation 65. As an alternative to the second magnetic components 29 shown in FIG. 16*a,* the two magnetic components 29 may be replaced by one magnetic component as shown in FIG. 16*b.*

To compensate for the variation in shape and/or size of hearing devices 1 the charger 25 is made with a gap 39 between a hearing device gap sidewall and a charger gap sidewall, as shown in FIG. 15, to be able to fit physical both large and small hearing devices. The receiver coil 3 is positioned in the hearing device 1 to have a predefined coil distance 40 to the transmitter coil 27 in the charger 25 when the hearing device 1 is placed/inserted in the charger 25.

In this embodiment the attachment interface comprises a magnet-to-magnet interface.

Figure 16B:
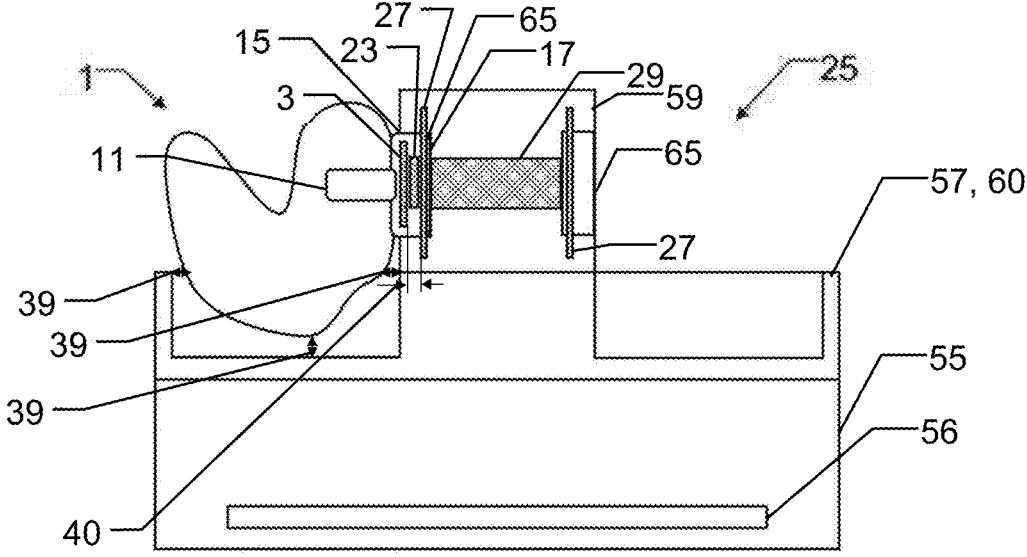

FIG. 16*b* schematically illustrates a wirelessly rechargeable hearing device 1 placed at or in a charger 25 for a wirelessly rechargeable hearing device. The hearing device 1 comprises a faceplate 15 with a faceplate surface 17, a first magnetic component 23, a rechargeable battery 11 and a receiver coil 3. The receiver coil 3 may comprise a copper layer on a PCB. The receiver coil 3 may further comprise a receiver coil magnetic shielding made of e.g. ferrite. The first magnetic component 23 may be a first attachment interface. The first magnetic component 23 is positioned adjacent to receiver coil 3, such as a front surface of the receiver coil 3, and adjacent to the faceplate surface 17, while the receiver coil 3 is positioned adjacent to a side of the battery 11, and adjacent to the first magnetic component 23. I.e. the first magnetic component 23 is positioned between the receiver coil 3 and the faceplate surface 17, while the receiver coil 3 is positioned between the side of the battery 11 and the first magnetic component 23. The hearing device 1 is in the illustrated example a custom in-the-ear (ITE) type hearing device 1 but could as well be a custom/non-custom invisible-in-canal (IIC), completely-in-canal (CIC), in-the-canal (ITC), or non-custom in-the-ear (ITE) type hearing device.

The charger 25 comprises a charger base 55 and an insert 57. The charger base 55 may be used with different types of hearing devices 1. The insert 57 may be adapted to the type of hearing devices. The insert 57 may be one of different types of inserts configured for being used in/with the charger 25, wherein each insert is adapted to a specific type of hearing devices. Each insert 57 thereby mechanically adapt the charger 25 to be used with a specific type of hearing device among a group of different types of hearing devices. The insert 57 may be adapted to be used with different sizes and shapes of a particular type of hearing devices. The charger base 55 may further comprise a Printed Circuit Board (PCB)/Printed Circuit Board Assembly (PCBA) 56. The insert 57 may be electrically connected to the charger base 55 through electrical wires 63 and a connector 61 as shown in FIG. 16*a.* The insert 57 comprises one or more transmitter coils 27 and a second magnetic component 29. The one or more transmitter coils 27 may each comprise a copper layer on a PCB. The one or more transmitter coils 27 may further each comprise a transmitter coil magnetic shielding made of e.g. ferrite. The second magnetic component 29 may be a second attachment interface. The electrical wires 63 and the connector 61 may connect the one or transmitter coils 27 in the insert 57 with the PCB/PCBA 56 in the charger base 55. The insert 57 comprises an insert base 60 and a tower 59. The insert base 60 and the tower 59 may be one integrated part or two separate parts attached to each other. The second magnetic component 29 and the one or more transmitter coils 27 are arranged in the tower 59. The tower 59 further comprises an indentation 65 for receiving the faceplate 15 of the hearing device 1. The tower 59 may comprise two indentations 65, each for receiving the faceplate 15 of a hearing device 1 of a pair of hearing devices. The two indentations 65 may be arranged at opposite sides of the tower 59. The second magnetic component 29 may be arranged between the two indentations 65. Around each indentation 65 may be arranged a transmitter coil 27. I.e., the transmitter coils 27 may comprise a centre hole configured to receive an indentation 65 of the charger 25. Alternatively, the one or more transmitter coils 27 may be arranged around the second magnetic component 29. In that case, the transmitter coils 27 may comprise a centre hole configured to receive the second magnetic component 29 of the charger 25. As an alternative to the second magnetic component 29 shown in FIG. 16*b* two second magnetic components may be used, one at/in the bottom of each indentation 65, as shown in FIG. 16*a*.

To compensate for the variation in shape and/or size of hearing devices 1 the charger 25 is made with one or more gaps 39 between one or more hearing device gap sidewalls and one more charger gap sidewalls, such as shown in FIG. 15, to be able to fit physical both large and small hearing devices. The receiver coil 3 is positioned in the hearing device 1 to have a predefined coil distance 40 to the transmitter coil 27 in the charger 25 when the hearing device 1 is inserted in the charger 25.

In this embodiment the attachment interface comprises a magnet-to-magnet interface.

Figure 16C:
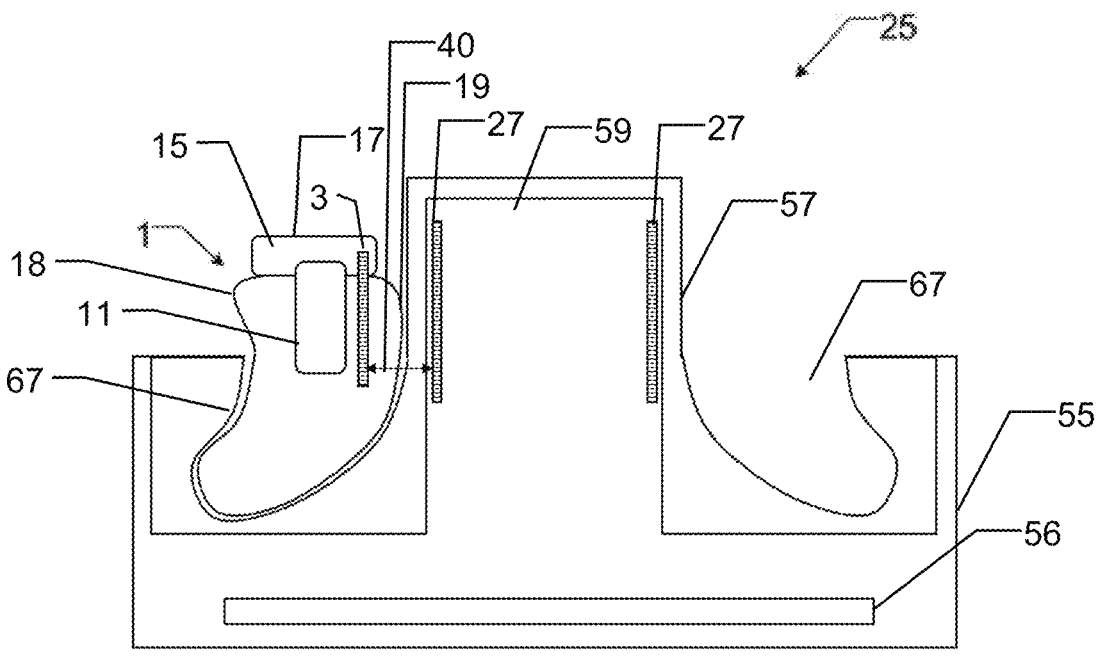

FIG. 16*c* schematically illustrates a wirelessly rechargeable hearing device 1 placed at or in a charger 25 for a wirelessly rechargeable hearing device. The hearing device 1 comprises a faceplate 15 with a faceplate surface 17, an in-ear part 18, a rechargeable battery 11 and a receiver coil 3. The receiver coil 3 may comprise a copper layer on a PCB. The receiver coil 3 may further comprise a receiver coil magnetic shielding made of e.g. ferrite. The receiver coil 3 is positioned adjacent to a terminal of the rechargeable battery 11, and adjacent to a hearing device sidewall 19. I.e. the receiver coil 3 is positioned between the terminal of the battery 11 and the hearing device sidewall 19. The hearing device 1 is in the illustrated example a completely-in-canal (CIC) type hearing device 1 but could as well be an invisible-in-canal (IIC), in-the-canal (ITC), or in-the-ear (ITE) type hearing device.

The charger 25 comprises a charger base 55 and an insert 57. The charger base 55 may be used with different types of hearing devices 1. The insert 57 is adapted to the type, size and/or shape of the hearing device 1, i.e. the insert 57 is a fitted and/or custom insert. The insert 57 is a removable insert which may be easily exchanged, i.e. easily removed from the charger base 55. The charger base 55 and the insert 57 may thus not be electrically connected through electrical wires and a connector as shown in FIG. 16*a*. The charger base 55 comprises a tower 59 and one or more transmitter coils 27 arranged in the tower 59. The one or more transmitter coils 27 may each comprise a copper layer on a PCB. The one or more transmitter coils 27 may further each comprise a transmitter coil magnetic shielding made of e.g.

ferrite. The charger base 55 may further comprise a Printed Circuit Board (PCB)/Printed Circuit Board Assembly (PCBA) 56. Electrical wires may connect the one or transmitter coils 27 with the PCB/PCBA 56. The insert 57 comprises one or more hearing device cavities 67, each for receiving a hearing device 1 of e.g. a pair of hearing devices. The hearing device cavities 67 may be shaped after the outer shape of the hearing device 1, such as shaped after at least parts of the outer shape of the in-ear part 18 of the hearing device 1. The hearing device cavities 67 may be a second attachment interface and at least parts of the outer surface of the in-ear part of the hearing device 1 may be a first attachment interface. The two hearing device cavities 67 may be connected via an intermediate part 69 placed over the tower 59 of the base charger 55. The hearing device cavities 67 may be arranged at opposite sides of the tower 59.

The receiver coil 3 is positioned in the hearing device 1 to have a predefined coil distance 40 to the transmitter coil 27 in the charger 25 when the hearing device 1 is inserted in the charger 25.

In this embodiment the attachment interfaces comprise a fitted and/or custom insert.

Figure 16D:
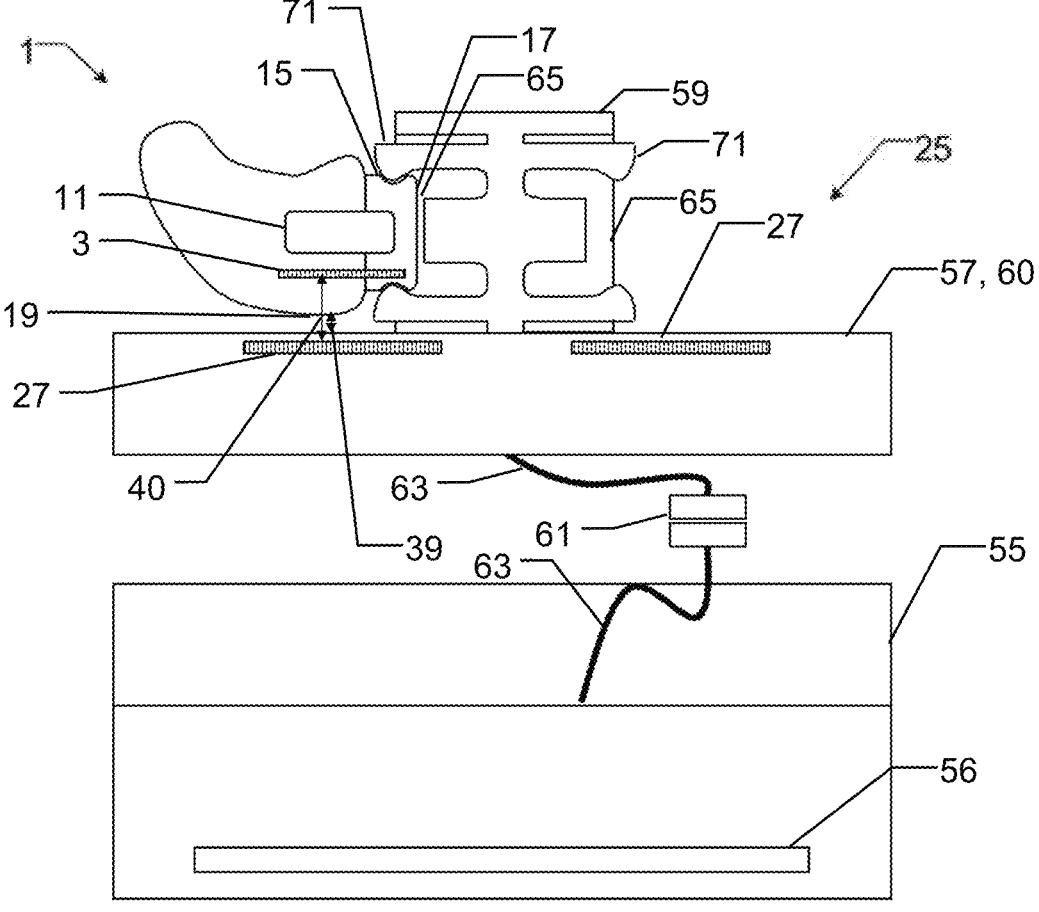

FIG. 16*d* schematically illustrates a wirelessly rechargeable hearing device 1 placed at or in a charger 25 for a wirelessly rechargeable hearing device. The hearing device 1 comprises a faceplate 15 with a faceplate surface 17, a rechargeable battery 11 and a receiver coil 3. The receiver coil 3 may comprise a copper layer on a PCB. The receiver coil 3 may further comprise a receiver coil magnetic shielding made of e.g. ferrite. The receiver coil 3 is positioned adjacent to a terminal of the rechargeable battery 11, and adjacent to a hearing device sidewall 19. I.e., the receiver coil 3 is positioned between the terminal of the battery 11 and the hearing device sidewall 19. The hearing device 1 may further be configured for being detachable attached to the charger 25 via a mechanical snap connection. As an example, the hearing device may comprise a recess 73 or the like configured for receiving a snap connection 71 of the charger 25. The recess 73 may be a first attachment interface and the snap connection 71 may be a second attachment interface. The hearing device 1 is in the illustrated example a completely-in-canal (CIC) type hearing device 1 but could as well be an invisible-in-canal (IIC), in-the-canal (ITC), or in-the-ear (ITE) type hearing device.

The charger 25 comprises a charger base 55 and an insert 57. The charger base 55 may be used with different types of hearing devices 1. The insert 57 may be adapted to the type of hearing device 1. The insert 57 may be one of different types of inserts configured for being used in/with the charger 25, wherein each insert is adapted to a specific type of hearing devices. Each insert 57 thereby mechanically adapt the charger 25 to be used with a specific type of hearing device among a group of different types of hearing devices. The insert 57 may be adapted to be used with different sizes and shapes of a particular type of hearing devices. The charger base 55 may further comprise a Printed Circuit Board (PCB)/Printed Circuit Board Assembly (PCBA) 56. The insert 57 may be electrically connected to the charger base 55 through electrical wires 63 and a connector 61. The insert 57 comprises one or more transmitter coils 27 and one or more snap connections 71. The one or more transmitter coils 27 may each comprise a copper layer on a PCB. The one or more transmitter coils 3 may each further comprise a transmitter coil magnetic shielding made of e.g. ferrite. The electrical wires 63 and the connector 61 may connect the one or transmitter coils 27 in the insert 57 with the PCB/PCBA 56 in the charger base 55. The insert 57 comprises an insert base 60 and a tower 59. The insert base 60 and the tower 59 may be one integrated part or two separate parts attached to each other. The one or more snap connections 71 is arranged in the tower 59 of the insert 57 and the one or more transmitter coils 27 are arranged in the insert base 60. The tower 59 further comprises an indentation 65 for receiving the faceplate 15 of the hearing device 1. The tower 59 may comprise two indentations 65, each for receiving the faceplate 15 of a hearing device 1 of a pair of hearing devices. The two indentations 65 may be arranged at opposite sides of the tower 59. The one or more snap connections 71 may be configured for holding and/or detachable fixing a hearing device in a predefined position in one of the one or more indentations 65.

To compensate for the variation in shape and/or size of hearing devices 1 the charger 25 is made with a gap 39 between a hearing device gap sidewall and a charger gap sidewall, as shown in FIG. 15, to be able to fit physical both large and small hearing devices. The receiver coil 3 is positioned in the hearing device 1 to have a predefined coil distance 40 to the transmitter coil 27 in the charger 25 when the hearing device 1 is placed/inserted in the charger 25.

In this embodiment the attachment interfaces comprise a mechanical snap connection.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

1 Wirelessly rechargeable hearing device
3 Receiver coil
5 Induction coil axial centreline
7 Hearing device electronics
9 Receiver
11 Rechargeable battery
13 Pull-out wire
15 Faceplate
17 Faceplate surface
18 In-ear part of hearing device sidewall
19 Hearing device sidewall
20 Charger sidewall
21a Receiver coil magnetic shielding
21b Transmitter coil magnetic shielding
23 First magnetic component/First attachment interface
25 Charger
27 Transmitter coil
29 Second magnetic component/Second attachment interface
31 Charger casing
33 Third magnetic component
35 Fourth magnetic component
36 Stop
37 Indentation
39 Gap
40 Predefined coil distance
41 Indentation charger surface
43 Charger gap surface
45 Hearing device gap surface
47 Indentation height 49 Behind-the-ear part
51 In-the-ear part
53 Tube
55 Charger base
56 PCB/PCBA
57 Insert
59 Tower
60 Insert base
61 Connector
63 Electrical wires
65 Indentation
67 Hearing device cavity/Second attachment interface
69 Intermediate part
71 Snap connection/Second attachment interface
73 Recess/First attachment interface
EC Ear canal
ED Eardrum
g Direction of gravity

The invention claimed is:

1. A wirelessly rechargeable hearing device comprising:
a housing;
a rechargeable battery;
inductive charging circuitry comprising a receiver coil configured for inductive coupling to a transmitter coil in a charger; and
a first magnetic component in the housing, wherein the first magnetic component is configured to magnetically engage with a second magnetic component of the charger in such a way as to facilitate inductive coupling between the receiver coil and the transmitter coil;
wherein the first magnetic component faces towards only a part, and not all, of a circumference of a curvilinear side of the rechargeable battery.

2. The wirelessly rechargeable hearing device according to claim 1, wherein the first magnetic component is a magnetic material, or a magnet.

3. The wirelessly rechargeable hearing device according to claim 1, wherein the first magnetic component is shaped to at least partially correspond with an outer surface of the rechargeable battery.

4. The wirelessly rechargeable hearing device according to claim 1, wherein the first magnetic component is a part of the rechargeable battery.

5. The wirelessly rechargeable hearing device according to claim 1, wherein the hearing device is an in-ear hearing device.

6. The wirelessly rechargeable hearing device according to claim 1, wherein the hearing device is a completely-in-the-canal hearing aid.

7. The wirelessly rechargeable hearing device according to claim 1, wherein the inductive charging circuitry is configured according to a standard of wireless power transfer.

8. The wirelessly rechargeable hearing device according to claim 7, wherein the inductive charging circuitry is configured according to a Near Field Communications (NFC) standard, or a Qi® standard.

9. The wirelessly rechargeable hearing device according to claim 1, wherein the receiver coil is separated from an outer surface of the rechargeable battery by a distance that is anywhere between 0.1 mm and 1 mm.

10. The wirelessly rechargeable hearing device according to claim 1, wherein the receiver coil is adjacent to a side or a terminal of the rechargeable battery.

11. The wirelessly rechargeable hearing device according to claim 1, wherein the first magnetic component is configured to interact magnetically with the second magnetic component in a direction that is at an angle of between-15 to 15 degrees to a centerline of the receiver coil.

12. The wirelessly rechargeable hearing device according to claim 1, wherein the receiver coil has a planar configuration.

13. The wirelessly rechargeable hearing device according to claim 12, wherein a plane of the receiver coil has a normal that intersects the rechargeable battery of the hearing device.

14. A wirelessly rechargeable hearing device comprising:
a housing;
a rechargeable battery;
inductive charging circuitry comprising a receiver coil configured for inductive coupling to a transmitter coil in a charger; and
a first magnetic component in the housing, wherein the first magnetic component is configured to magnetically engage with a second magnetic component of the charger in such a way as to facilitate inductive coupling between the receiver coil and the transmitter coil;
wherein the first magnetic component is configured to interact magnetically with the second magnetic component in a direction that is at an angle of between 75 to 105 degrees to a centerline of the receiver coil, the centerline being perpendicular to loops of the receiver coil.

15. A wirelessly rechargeable hearing device comprising:
a housing;
a rechargeable battery having a planar surface;
inductive charging circuitry comprising a receiver coil configured for inductive coupling to a transmitter coil in a charger; and
a first magnetic component in the housing, wherein the first magnetic component is configured to magnetically engage with a second magnetic component of the charger in such a way as to facilitate inductive coupling between the receiver coil and the transmitter coil;
wherein the first magnetic component is between a plane formed by loops of the receiver coil and the planar surface of the rechargeable battery.

16. The wirelessly rechargeable hearing device according to claim 15, wherein the first magnetic component is configured to interact magnetically with the second magnetic component in a direction that is at an angle of between-15 to 15 degrees to a centerline of the receiver coil, the centerline being perpendicular to the loops of the receiver coil.

17. The wirelessly rechargeable hearing device according to claim 15, wherein the hearing device is an in-ear hearing device.

18. The wirelessly rechargeable hearing device according to claim 15, wherein the hearing device is a completely-in-the-canal hearing aid.

19. The wirelessly rechargeable hearing device according to claim 15, wherein the inductive charging circuitry is configured according to a standard of wireless power transfer.

20. The wirelessly rechargeable hearing device according to claim 19, wherein the inductive charging circuitry is configured according to a Near Field Communications (NFC) standard, or a Qi® standard.

21. The wirelessly rechargeable hearing device according to claim 15, wherein the receiver coil is separated from an outer surface of the rechargeable battery by a distance that is anywhere between 0.1 mm and 1 mm.

22. The wirelessly rechargeable hearing device according to claim 15, wherein the plane has a normal that intersects the rechargeable battery of the hearing device.

23. A charger for wirelessly recharging a hearing device, the charger comprising:
a transmitter coil configured for inductive coupling to a receiver coil in the hearing device, the hearing device comprising a first magnetic component; and
a second magnetic component configured to magnetically engage with the first magnetic component of the hearing device in such a way as to facilitate the inductive coupling between the receiver coil and the transmitter coil;
wherein the second magnetic component of the charger has a surface facing towards a rechargeable battery of the hearing device when the charger receives the hearing device for recharging;
wherein the transmitter coil has a planar configuration, and wherein the surface of the second magnetic component is parallel to the planar configuration of the transmitter coil.

24. The charger according to claim 23, wherein the second magnetic component comprises a magnetic material, or a magnet.

25. The charger according to claim 24, wherein the second magnetic component further comprises a metallic plate covering the magnetic material or the magnet.

26. The charger according to claim 25, wherein the metallic plate comprises an external surface facing an external environment outside the charger.

27. The charger according to claim 23, further comprising a housing, wherein the second magnetic component is inside the housing of the charger.

28. The charger according to claim 27, wherein the housing of the charger comprises a metallic part covering the second magnetic component.

29. The charger according to claim 23, wherein the planar configuration of the transmitter coil has a normal that intersects the rechargeable battery of the hearing device when the charger receives the hearing device for recharging.

30. A system comprising the charger of claim 23, and the hearing device.

31. The system of claim 30, wherein the hearing device comprises:
a housing;
the rechargeable battery;
inductive charging circuitry comprising the receiver coil configured for inductive coupling to the transmitter coil in a charger; and
the first magnetic component;
wherein the first magnetic component is in the housing.

32. The system according to claim 31, wherein the receiver coil has a cross sectional dimension that is smaller than a cross sectional dimension of the transmitter coil.

\* \* \* \* \*